(12) United States Patent
Arahira et al.

(10) Patent No.: US 8,107,154 B2
(45) Date of Patent: Jan. 31, 2012

(54) OPTICAL MODULATOR AND OPTICAL SIGNAL GENERATION APPARATUS

(75) Inventors: Shin Arahira, Tokyo (JP); Hitoshi Murai, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 725 days.

(21) Appl. No.: 12/289,871

(22) Filed: Nov. 6, 2008

(65) Prior Publication Data

US 2009/0195860 A1    Aug. 6, 2009

(30) Foreign Application Priority Data

Feb. 4, 2008    (JP) .................. 2008-024274

(51) Int. Cl.
*G02F 1/01* (2006.01)
*G02F 1/35* (2006.01)
*G02B 6/00* (2006.01)
*G02B 6/12* (2006.01)

(52) U.S. Cl. ...................................... 359/279

(58) Field of Classification Search .............. 359/279, 359/237, 326–332; 385/11, 14
See application file for complete search history.

(56) References Cited

U.S. PATENT DOCUMENTS

| 2002/0179912 A1* | 12/2002 | Batchko et al. ............... 257/79 |
| 2006/0039642 A1* | 2/2006 | Arahira ........................ 385/11 |

FOREIGN PATENT DOCUMENTS

JP    A 2006-58508    3/2006

OTHER PUBLICATIONS

Arai Shin-ichi et al., "Polarization Maintaining Fiber", Furukawa Denko Jiho (Furukawa Electric Review, Japanese version), No. 109, pp. 5-10, Jan. 2002.
"Ultrafast Optical multi/demultiplexer utilizing optical Kerr effect in polarization-maintaining single-mode fibers", T. Morioka, M. Saruwatari and A. Takada, Electronic Letters, vol. 23, No. 9 pp. 453-454, 1987.
S. Arahira, H. Murai, and Y. Ogawa, "Modified NOLM for Stable and Improved 2R Operation at Ultra-High Bit Rates", IEICE Trans. Commun. vol. E89-B, No. 12, pp. 3296-3305, 2006.
Shin Arahira, Hiroki Yaegashi, Koji Nakamura, and Yoh Ogawa, "Chirp Control and Broadband wavelength-tuning of 40-GHz Monolithic Actively mode-locked laser diodes module with an external CWlight injection", IEEE J. Selected Topics in Quantum Electron, vol. 11, No. 5, pp. 1103-1111, 2005.
P.V. Mamyshev, "All-Optical data Regeneration based on self-phase modulation effect", Technical digest of European Conference on Optical Communication 98 (ECOC 98), vol. 1, pp. 475-476, Madrid, Spain, 1998.

* cited by examiner

*Primary Examiner* — Dawayne Pinkney
(74) *Attorney, Agent, or Firm* — SOLARIS Intellectual Property Group, PLLC

(57) ABSTRACT

An optical modulator includes, a first polarization separation and combination portion, a second polarization separation and combination portion, a first polarization plane-maintaining optical fiber, a second polarization plane-maintaining optical fiber, a third polarization plane-maintaining optical fiber of which a first end is coupled with the second input and output terminal of the second polarization separation and combination portion, the third polarization plane-maintaining optical fiber including a first optical coupler, to which control light that is linearly polarized light is input, a fourth polarization plane-maintaining optical fiber of which a first end is coupled with the third input and output terminal of the second polarization separation and combination portion; and a first polarization plane conversion portion that optically communicates with a second end of the third polarization plane-maintaining optical fiber and a second end of the fourth polarization plane-maintaining optical fiber.

14 Claims, 11 Drawing Sheets

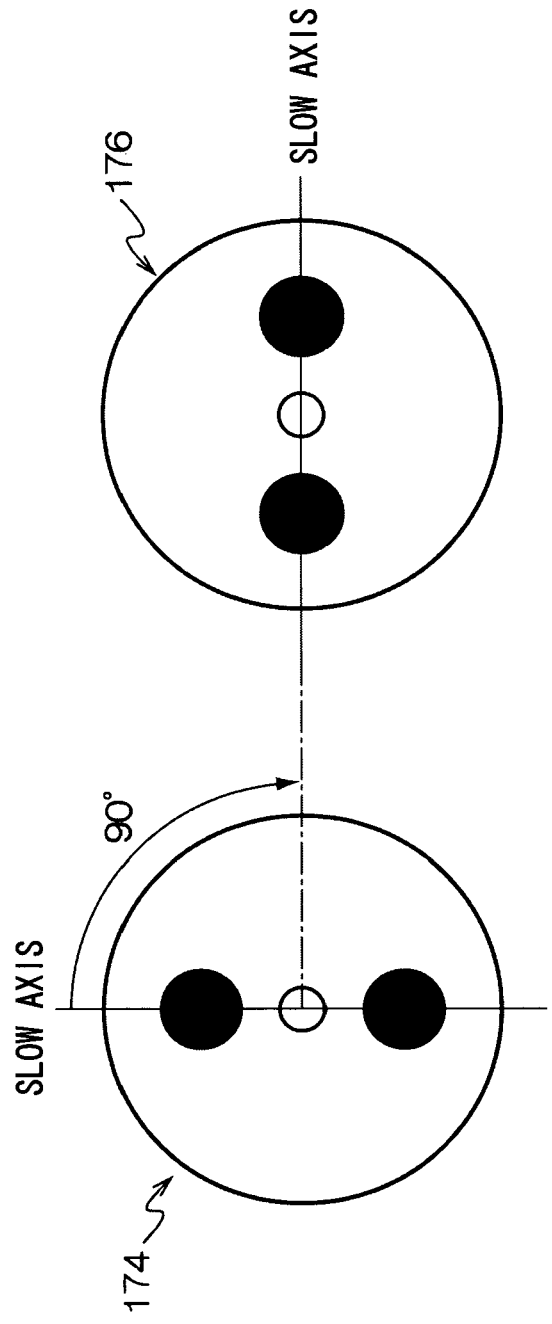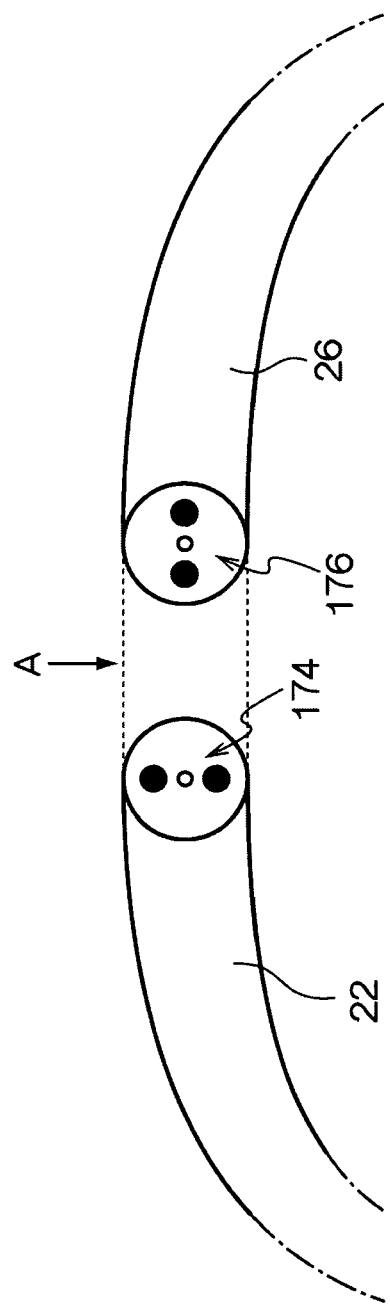

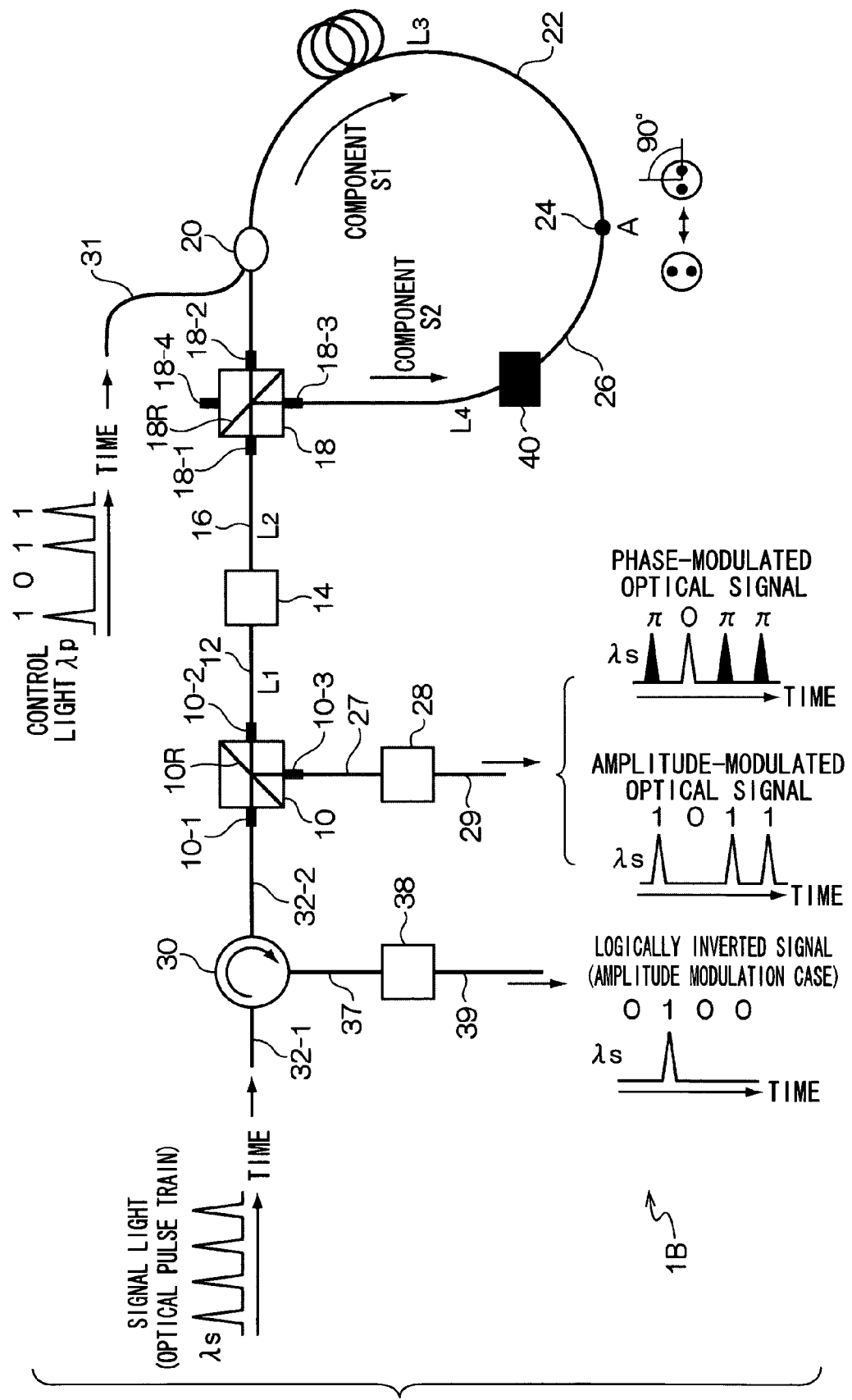

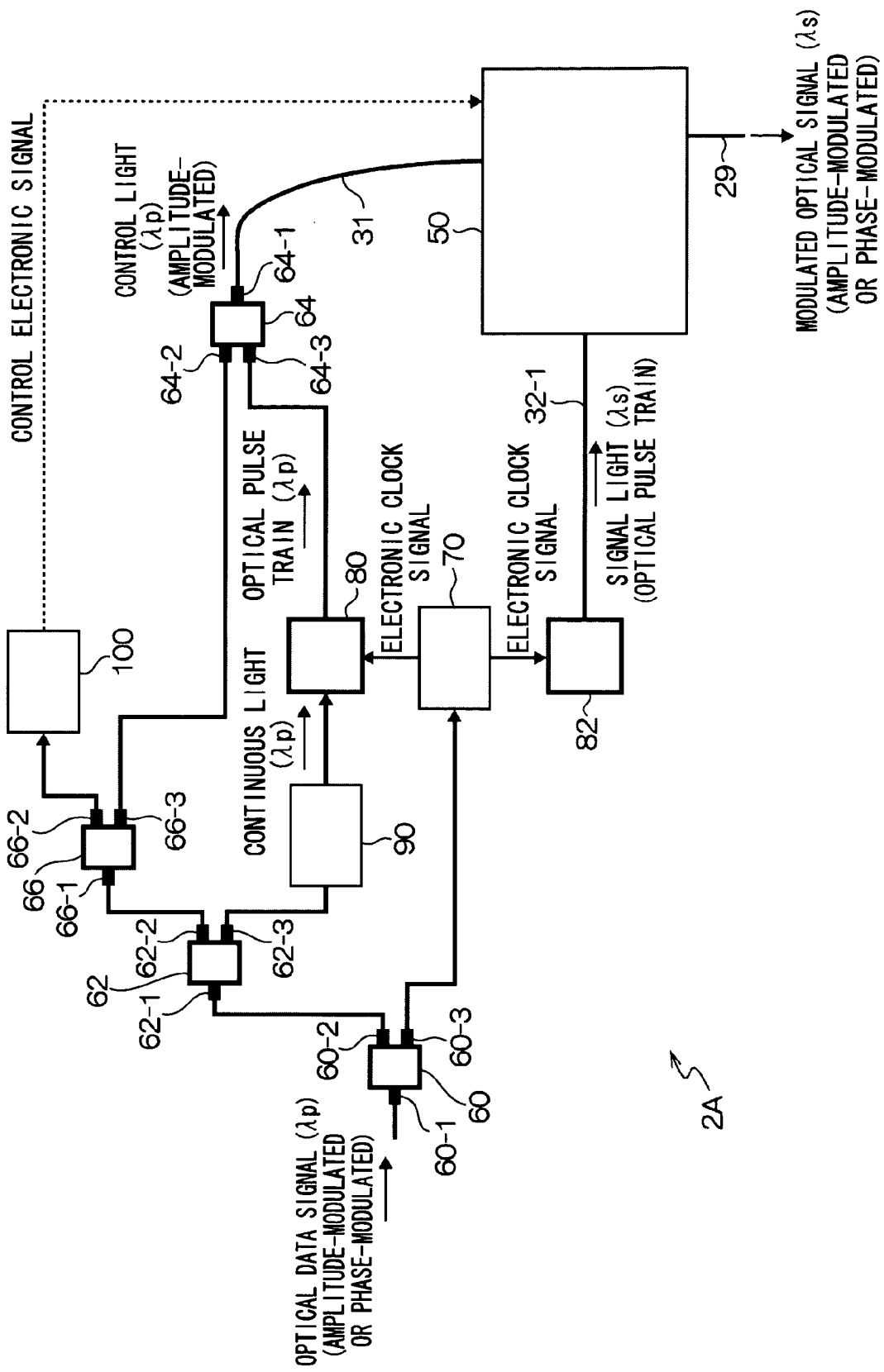

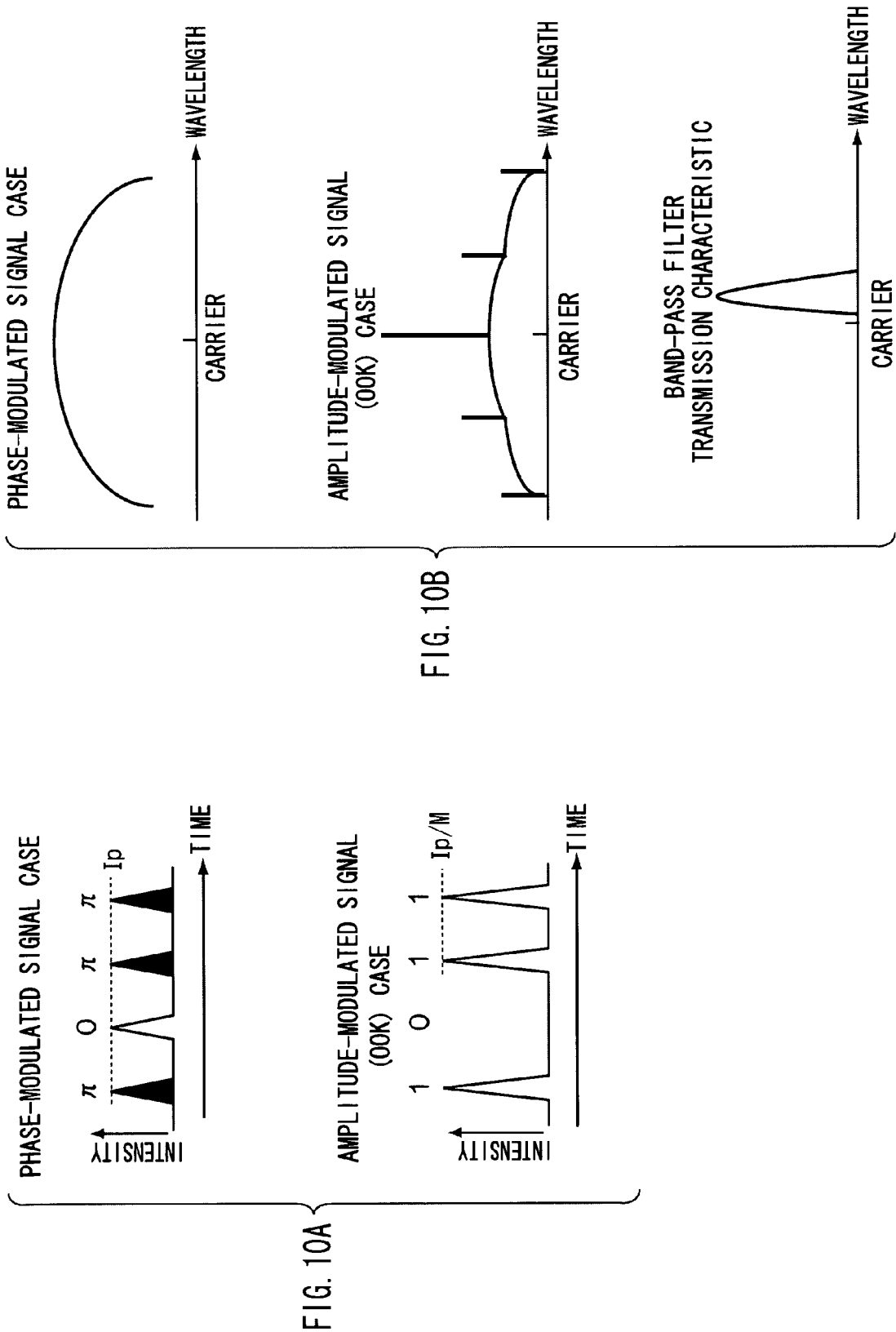

OPTICAL MODULATOR AND OPTICAL SIGNAL GENERATION APPARATUS

CROSS-REFERENCE TO RELATED APPLICATION

This application claims priority under 35 USC 119 from Japanese Patent Application No. 2008-024274, the disclosure of which is incorporated by reference herein.

BACKGROUND OF THE INVENTION

1. Field of the Invention

The present invention relates to an optical modulator and an optical signal generation apparatus, and is applicable to, for example, an optical modulator and optical signal generation apparatus that are used in long-distance, large-capacity optical fiber communications or the like and that provide intensity modulation or phase modulation to controlled light in accordance with control light.

2. Description of the Related Art

With the development of network technologies, as represented by the Internet and suchlike, demands for increases in communication capacities of optical fiber communications have been progressively rising.

Increases in communication capacities of optical fiber communications in recent years have been implemented by increases in numbers of wavelength channels capable of communication (for example, WDM: wavelength division multiplexing technologies) and by increases in bit rates of respective wavelength channels.

As technologies that increase bit rates per wavelength channel, multiplexing communication methods such as, for example, TDM (Time Division Multiplexing communications) and the like have been investigated and put into practice. A TDM system is a system that increases the bit rate per wavelength channel by using a time division multiplexed signal in which plural channels are multiplexed in time divisions.

At the receiving side, the TDM system is provided with a multiplex separation section that separates individual channels out from a time division multiplexed signal on the basis of gate signals generated from a clock signal, and implements reception by separately extracting information from the individual channels. A conventionally employed TDM system is a system that performs time division multiplexing signal generation and multiplexed signal separation at the level of electronic devices. Such a system is referred to in particular as electrical TDM.

To increase the bit rate of electrical TDM, increases in speed of electronic devices and opto-electronic devices, such as photodiodes for opto-electronic conversion, semiconductor lasers and the like, are required. Bit rates thereof have a limit at a bit rate of around 40 Gbit/s.

Thus, to further increase the bit rates of TDM systems, it is desirable to implement the aforementioned time division multiplexing signal generation and multiplexed signal separation section with completely optical means. Such a system is referred to in particular as optical TDM.

In an optical TDM system, it is desirable to generate time division multiplexed optical pulse signals using an optical circuit in which, for example, optical couplers and the like are combined. Further, it is desirable to implement separation at the receiving side using all-optical optical switches, gates of which are operated by optical control signals, which are control light. Further yet, at optical relays for long-distance communication, nodes of optical networks and the like, optical signal control technologies are required, for wavelength conversions, the generation of modulated optical signals and the like, and also for optical signal regeneration operations and the like. Similarly, these too are desirably implemented using all-optical wavelength converters, optical modulators and the like, which perform wavelength conversions of controlled optical signals, generation of modulated optical signals, signal regeneration and so forth with controlling optical signals.

That is, in an optical TDM system, in order to implement separation at the receiving side thereof, and optical signal regeneration at optical relays and the like, all-optical optical switches and modulators are required, which perform switching operations and modulated signal generation operations on controlled optical signals with controlling optical signals.

A preferable example of a technology for implementing all-optical optical switches and modulators is a process that utilizes the optical Kerr effect, which occurs in optical fibers.

The optical Kerr effect that occurs in optical fibers is a phenomenon in which the refractive index of an optical fiber is changed by strong-intensity light propagating through the optical fiber. A response rate of the effect is a few femtoseconds (fs). Thus, when the optical Kerr effect in optical fibers is utilized in constituting an optical switch or optical modulator or the like, it is possible to realize optical switches and optical modulators that are capable of switching and modulating optical pulse signals of the order of several hundred Gbit/s and upward.

As an optical switch that utilizes the optical Kerr effect, an optical switch utilizing the optical Kerr effect that occurs in polarization plane-maintaining-type single-mode optical fibers has been investigated, for example, in "Ultrafast Optical multi/demultiplexer utilizing optical Kerr effect in polarization-maintaining single-mode fibers", T. Morioka, M. Saruwatari and A. Takada, Electronic Letters, Vol. 23, No. 9 pp. 453-454, 1987.

The switch utilizing the optical Kerr effect that is disclosed by Morioka et al. utilizes a polarization-maintaining single-mode optical fiber (hereinafter referred to as a "polarization plane-maintaining optical fiber" or simply an "optical fiber") as the optical fiber in which the optical Kerr effect occurs.

This polarization plane-maintaining optical fiber has a constitution in which equivalent refractive indices for guided light differ between the direction of an optical axis known as the phase lag axis or slow axis, which is set in a plane orthogonal to the propagation direction of light in the optical fiber (which is hereinafter referred to as an optical axis direction of the optical fiber), and the direction of an optical axis known as the phase lead axis or fast axis, which intersects the slow axis.

Further, an optical fiber utilized in an optical switch that is disclosed by Morioka et al. has a constitution that includes a face at which two polarization-maintaining single-mode optical fibers are fused, with the optical axes intersecting, which enables birefringence characteristics of the polarization plane-maintaining-type single-mode optical fibers to offset one another.

Into the optical switch described by Morioka et al. are input linearly polarized control light, with a polarization plane parallel to an optical axis of a polarization plane-maintaining optical fiber, and linearly polarized signal light (controlled light), with a polarization plane angled at 45° from the optical axis of the polarization plane-maintaining optical fiber.

When an optical pulse constituting signal light and an optical pulse constituting control light are not synchronously input into this optical switch, the signal light optical pulse is output in a linearly polarized state the same as at the input into the light switch. On the other hand, when a control light optical pulse and a signal light optical pulse are synchronously input, the optical Kerr effect is induced by the control light optical pulse for, of polarization components of the signal light optical pulse, a polarization component that is parallel with the polarization direction of the control light optical pulse. That is, a phase shift is caused in the signal light optical pulse by a cross phase modulation effect between the signal light optical pulse and the control light optical pulse, because of the optical Kerr effect.

Herein, a control light optical pulse and a signal light optical pulse being input synchronously signifies a state in which, when an individual optical pulse signal including control light is input into a third polarization plane-maintaining optical fiber 22 which will be described hereinafter, a delay time of the control light pulse signal or the signal light is regulated and the control light pulse signal is input so as to temporally coincide with an individual optical pulse including the signal light. At such a time, as will be described in more detail hereinafter, a walk-off effect can be expected due to group velocity dispersion, so the inputs may be provided with a slight offset between a position of the control light optical pulse and a position of the signal light optical pulse. The meaning of synchronized input states covers states including such cases.

When an amount of the phase shift $\phi$ is equal to $\pi$, the polarization direction of the signal light optical pulse is rotated through 90° from when it is input into the optical switch. That is, the polarization direction of the signal light optical pulse rotates to a direction at −45° with respect to the optical axis of the optical fiber. Hence, by an analyzer being disposed at the output side of the optical switch, the signal light optical pulse may be transmitted or blocked in accordance with the control light.

That is, if the direction of an optical axis of the analyzer is set to be arranged in an orientation with which the signal light optical pulse is transmitted when the polarization direction thereof has been rotated by 90° from input into the optical switch and the signal light optical pulse is blocked when the polarization direction is the same as at input, only optical pulses whose polarization plane has been rotated by the control light may be transmitted through the light switch, and the signal light optical pulses can be switched.

In realizing the optical switch disclosed by Morioka et al., there is a problem in that fiber lengths of the two polarization-maintaining single-mode optical fibers must be strictly regulated, and fabrication of the actual device is complicated. In addition, there is a problem with instability of switch operations, due to polarization cross-talk components that are present in the actual polarization-maintaining single-mode optical fibers, as described in Arai Shin-ichi et al., "Polarization Maintaining Fiber", *Furukawa Denko Jiho* (Furukawa Electric Review, Japanese version), No. 109, pp. 5-10, January 2002.

As a method for solving these problems, an optical switch as referred to in Japanese Patent Application Laid-Open (JP-A) No. 2006-58508 has been proposed.

That is, JP-A No. 2006-58508 discloses an optical switch in which regulation of fiber lengths of polarization-maintaining single-mode optical fibers that constitute an optical switch is unnecessary, and even if a long strip-form fiber is used as a polarization-maintaining single-mode optical fiber in which the optical Kerr effect is produced, instability of switch operations due to polarization cross-talk components does not arise.

Many different kinds of encoding formats for optical signals to be used in optical communications systems have been proposed and employed. Representative examples thereof are an amplitude modulation system, which represents a binary digital signal by magnitude relationships of peak intensities of an optical signal, and a phase modulation system, which represents a binary digital signal by optical phase differences in an optical carrier wave of an optical signal.

Of the amplitude modulation system and the phase modulation system, it is desirable to suitably select and employ whichever provides maximum satisfaction of required specifications of respective networks. Optical communications networks include modes in which plural networks with different specifications optically communicate to one another. Thus, it is desirable for optical communications networks to mix and employ different optical signals encoded with different modulation formats, such as an amplitude modulation system, a phase modulation system and the like, whichever are suitable for respective locations.

In consideration of these circumstances, it is desirable for an optical modulator that generates encoded optical signals to have general applicability so as to be applicable to either system, of an amplitude modulation system and a phase modulation system.

The all-optical light switches disclosed in the aforementioned Morioka et al. and JP-A No. 2006-58508 utilize optical pulse signals encoded by an amplitude modulation system based on magnitude relationships of peak intensities as control lights. Therefore, these switches may be used as all-optical light intensity modulators that generate amplitude-modulated modulated optical signals.

However, it is difficult to use these all-optical light switches as all-optical optical phase modulators that generate phase-modulated modulated optical signals.

The cross phase modulation effect caused by the optical Kerr effect, which is the principle of operation of these all-optical light switches, can also be used as the principle of operation of a phase modulator, without alteration. Therefore, an all-optical optical phase modulator that utilizes this effect may be provided.

However, in such a case, for compatibility with both an amplitude modulation system and a phase modulation system, separate all-optical light modulators corresponding to the respective systems must be prepared. This leads to increases in size of equipment, rises in costs and increases in power consumption, which are problematic.

If it is possible to realize an all-optical amplitude/phase modulator that is capable, using a single apparatus, of generating optical signals in formats for both an amplitude modulation system and a phase modulation system with a simple means of adjustment, the above problem can be solved. For such a case, it is desirable in practice if this is not associated with significant changes in light losses and the like in accordance with changes in modulation format, or significant changes in signal quality. Furthermore, if characteristics do not vary even with changes in signal light wavelength, environmental temperature and the like and highly stable operation characteristics can be assured, great advantages can be obtained in practice without increases in component numbers, costs and power consumption in relation to stabilization control.

Accordingly, the present invention provides an all-optical optical modulator that is capable of generating optical signals in formats for both an amplitude modulation system and a phase modulation system, with a simple means of adjustment, and of which operations are highly stable. Furthermore, an optical signal generation apparatus that uses this optical modulator is provided.

SUMMARY OF THE INVENTION

The present invention has been made in view of the above circumstances and provides an optical modulator and an optical signal generation apparatus.

A first aspect of the present invention provides the optical modulator including: a first polarization separation and combination portion that includes a first input and output terminal, at which signal light that is linearly polarized light is input, a second input and output terminal, which is provided at a side opposite from the first input and output terminal, and a third input and output terminal, which outputs modulated signal light; a second polarization separation and combination portion that comprises a first input and output terminal, a second input and output terminal, which is provided at a side opposite from the first input and output terminal, a third input and output terminal, and a fourth input and output terminal, which is provided at a side opposite from the third input and output terminal and outputs a polarization cross-talk component of the signal light; a first polarization plane-maintaining optical fiber of which a first end is coupled with the second input and output terminal of the first polarization separation and combination portion; a second polarization plane-maintaining optical fiber of which a first end is coupled with the first input and output terminal of the second polarization separation and combination portion; a polarization plane rotation adjustment portion that comprises a half-wavelength plate which optically communicates with a second end of the first polarization plane-maintaining optical fiber and a second end of the second polarization plane-maintaining optical fiber, an optical axis direction of the half-wavelength plate being rotatable; a third polarization plane-maintaining optical fiber of which a first end is coupled with the second input and output terminal of the second polarization separation and combination portion, the third polarization plane-maintaining optical fiber including a first optical coupler, to which control light that is linearly polarized light is input; a fourth polarization plane-maintaining optical fiber of which a first end is coupled with the third input and output terminal of the second polarization separation and combination portion; and a first polarization plane conversion portion that optically communicates with a second end of the third polarization plane-maintaining optical fiber and a second end of the fourth polarization plane-maintaining optical fiber, the first polarization plane conversion portion converting a polarization plane of input signal light.

A second aspect of the present invention provides an optical signal generation apparatus including: a clock signal generation portion that, on the basis of an input optical signal from outside, generates an electronic clock signal with a frequency corresponding to a bit rate of the input optical signal; a first optical pulse train generation portion that, on the basis of the electronic clock signal from the clock signal generation portion, generates an optical pulse train that is synchronized with the input optical signal from outside; an optical phase synchronization portion that, on the basis of the input optical signal from outside, outputs continuous light with the same wavelength and the same phase as the input optical signal; a second optical pulse train generation portion that, on the basis of the electronic clock signal from the clock signal generation portion, receives the continuous light from the optical phase synchronization portion, and generates an optical pulse train with the same wavelength and the same phase as the input optical signal from outside in accordance with an optical injection locking phenomenon; an optical coupler that outputs interference light generated between the optical clock pulse train from the second optical pulse train generation portion and the input optical signal from outside; and the optical modulator according to the above-mentioned first aspect, to which the output light from the optical coupler is input to serve as the control light and the optical pulse train from the first optical pulse train generation portion is input to serve as the signal light.

BRIEF DESCRIPTION OF THE DRAWINGS

FIG. 3A and FIG. 3B are explanatory diagrams describing an optical communication method at a first polarization plane conversion section of the first exemplary embodiment.

FIG. 6 is a diagram showing a structure of an optical modulator of a second exemplary embodiment.

FIG. 8 is a diagram showing a structure of an optical signal generation apparatus of a third exemplary embodiment.

FIG. 10A and FIG. 10B are explanatory diagrams describing an optical data signal identification method according to an optical data signal identification circuit of the third exemplary embodiment.

DETAILED DESCRIPTION OF THE INVENTION

First Exemplary Embodiment

Figure 1:
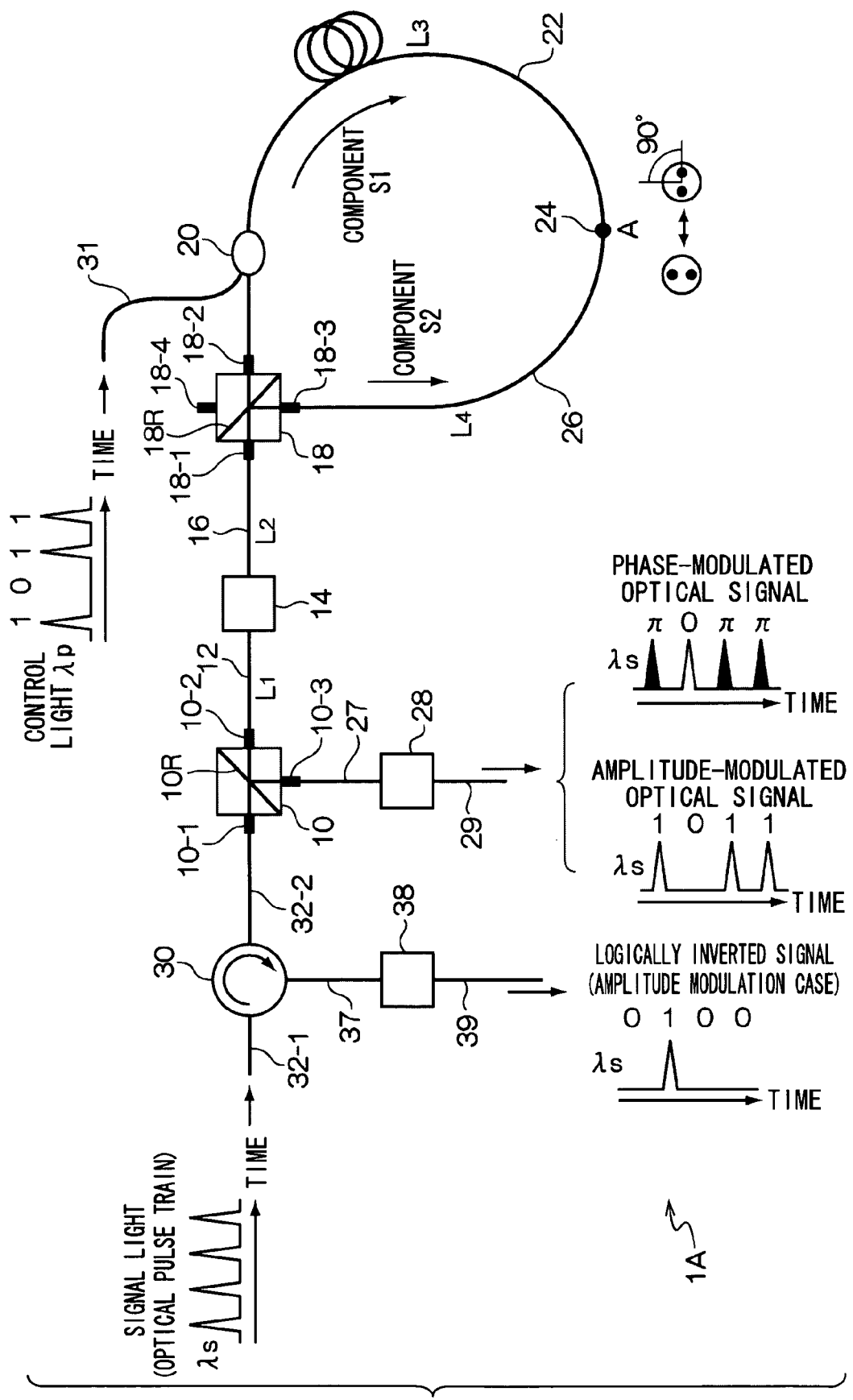
FIG. 1 is a diagram showing a structure of an optical modulator of a first exemplary embodiment.

Herebelow, a first exemplary embodiment of the optical modulator of the present invention will be described in detail while referring to the drawings. In this first exemplary embodiment, a case in which the all-optical optical modulator of the present invention is applied to an optical switch is exemplified.

Structure of the First Exemplary Embodiment

Overall Structure

FIG. 1 is a diagram showing a general structure of an optical modulator of a first exemplary embodiment. In FIG. 1, the optical modulator 1A of the first exemplary embodiment is an all-optical optical modulator and is provided with at least a first polarization separation/combination module 10, a second polarization separation/combination module 18, a first polarization plane-maintaining optical fiber 12, a second polarization plane-maintaining optical fiber 16, a half-wavelength plate 14, the third polarization plane-maintaining optical fiber 22, a fourth polarization plane-maintaining optical fiber 26 and a first polarization plane conversion portion 24.

In addition to the above structures, the optical modulator 1A shown in FIG. 1 is also provided with at least a first optical coupler 20, optical band-pass filters 28 and 38, a 3-port optical circulator 30, signal light input optical fibers 32-1 and 32-2, converted light signal output optical fibers 27, 29, 37 and 39, and a control light input/output port 31.

The first polarization separation/combination module 10 is equipped with a first input/output terminal 10-1, to which one end of the signal light input optical fiber 32-2 is coupled for inputting signal light, a second input/output terminal 10-2 at a side of the first polarization separation/combination module 10 that is opposite from a side thereof at which the first input/output terminal 10-1 is provided, to which one end of the first polarization plane-maintaining optical fiber 12 is coupled, and a third input/output terminal 10-3, which outputs modulated signal light (hereinafter referred to as a modulated optical signal).

The second polarization separation/combination module 18 is equipped with a first input/output terminal 18-1, to which one end of the second polarization plane-maintaining optical fiber 16 is coupled, a second input/output terminal 18-2 at a side of the second polarization separation/combination module 18 that is opposite from a side thereof at which the first input/output terminal 18-1 is provided, to which one end of the third polarization plane-maintaining optical fiber 22 is coupled, a third input/output terminal 18-3, to which one end of the fourth polarization plane-maintaining optical fiber 26 is coupled, and a fourth input/output terminal 18-4 at a side of the second polarization separation/combination module 18 that is opposite from a side thereof at which the third input/output terminal 18-3 is provided, which outputs a polarization cross-talk component. The first and second polarization separation/combination modules 10 and 18 may employ, for example, favorable beam splitters from among previously known polarizing beam splitters that utilize thin films. The first and second polarization separation/combination modules 10 and 18 are not limited to the example of polarizing beam splitters that utilize thin films; "polarizing prisms" that utilize birefringent crystals may also be employed.

The first polarization plane-maintaining optical fiber 12 is an optical fiber of which one end is coupled to the second input/output terminal 10-2 of the first polarization separation/combination module 10 and the other end is coupled to the half-wavelength plate 14.

The second polarization plane-maintaining optical fiber 16 is an optical fiber of which one end is coupled to the half-wavelength plate and the other end is coupled to the first input/output terminal 18-1 of the second polarization separation/combination module 18.

The half-wavelength plate 14 is coupled with the first polarization plane-maintaining optical fiber 12 and the second polarization plane-maintaining optical fiber 16. The half-wavelength plate 14 outputs linearly polarized light input through the first polarization plane-maintaining optical fiber 12 to the second polarization plane-maintaining optical fiber 16 as linearly polarized light with an arbitrary polarization direction, or linearly polarized light with a polarization direction of two directions determined by a method to be described later.

Functioning of this half-wavelength plate 14 may be realized with the provision of a polarization-rotation device that rotates a polarization direction of the half-wavelength plate 14 by manual operation or automatically in accordance with a provided control signal. For the polarization rotation device utilizing this half-wavelength plate, a polarization plane-rotation module that implements a polarization plane-rotation technology, which is a previously known technology, may be broadly applied.

The third polarization plane-maintaining optical fiber 22 is an optical fiber of which one end is coupled to the second input/output terminal 18-2 of the second polarization separation/combination module 18 and the other end is coupled to the first polarization plane conversion portion 24 (shown with "A" in FIG. 1). The third polarization plane-maintaining optical fiber 22 is equipped with the first optical coupler 20, which includes the control light input/output port 31.

For the first optical coupler 20, it is desirable to employ a polarization plane-maintaining-type optical coupler. The first optical coupler 20 propagates control light, which is linearly polarized light input through the control light input/output port 31, to the third polarization plane-maintaining optical fiber 22 and the fourth polarization plane-maintaining optical fiber 26, in this order.

Herein, for the first optical coupler 20, a "3 dB optical coupler" designed with a light-splitting ratio of 1:1, a WDM coupler designed so as to couple/split control light and signal light with respectively different wavelengths, or the like may be used.

The fourth polarization plane-maintaining optical fiber 26 is an optical fiber of which one end is coupled to the first polarization plane conversion portion 24 and the other end is coupled to the third input/output terminal 18-3 of the second polarization separation/combination module 18.

The first polarization plane conversion portion 24 is coupled with the third polarization plane-maintaining optical fiber 22 and the fourth polarization plane-maintaining optical fiber 26, and is disposed at the position shown with an "A" in FIG. 1.

Details of Structural Elements

PANDA (Polarization-maintaining AND Absorption-reducing) type optical fibers may be employed as favorable polarization plane-maintaining optical fibers that are utilized as the first to fourth polarization plane-maintaining optical fibers 12, 16, 22 and 26 and the first optical coupler 20 or the like. These PANDA-type optical fibers are formed with stress provision portions in the vicinity of the core and are provided with polarization maintaining characteristics by the application of strong stress to the core.

Figure 2:
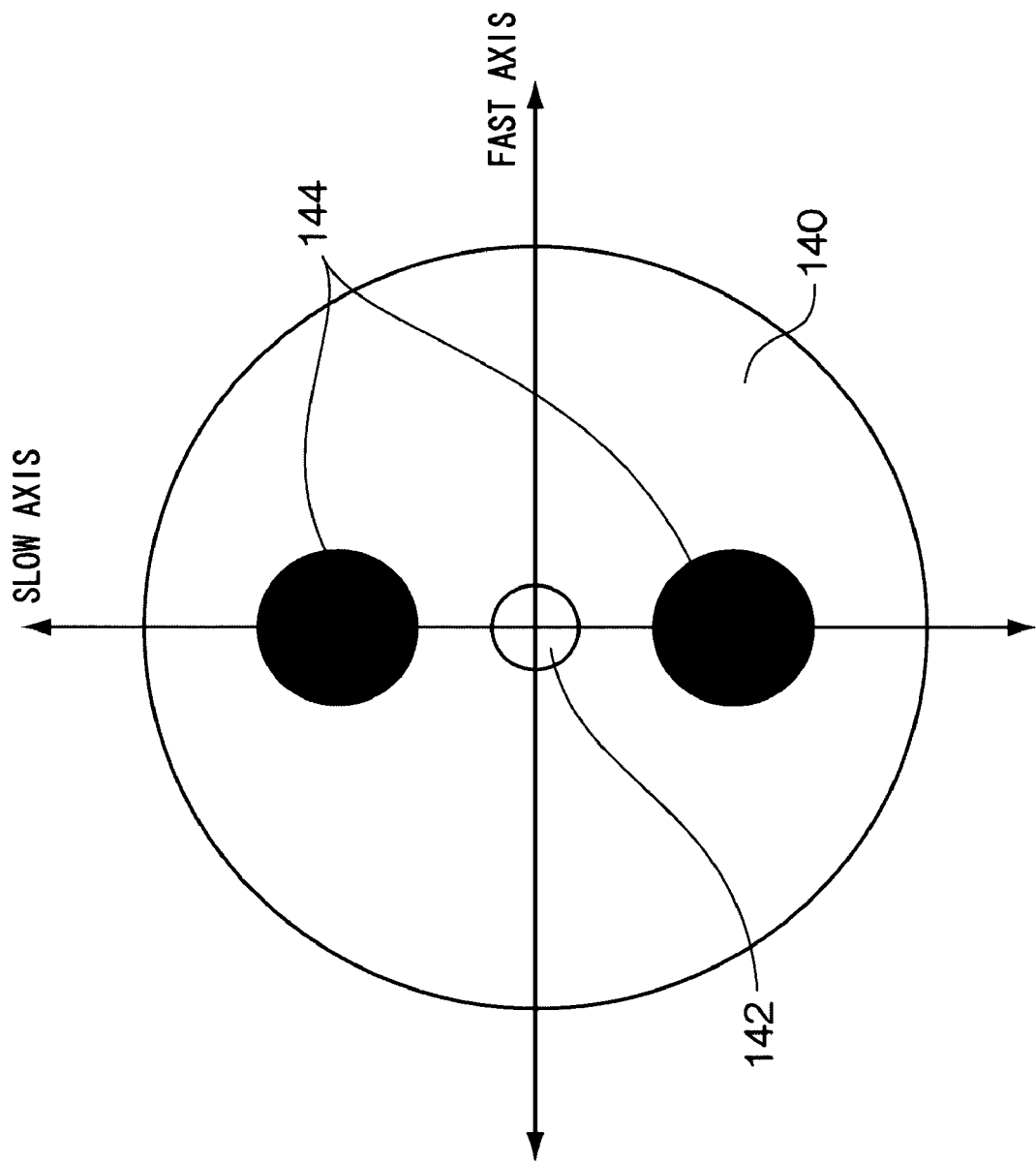
FIG. 2 is a schematic sectional constitutional diagram of a section cut orthogonally to a light propagation direction of a PANDA-type optical fiber employed for a polarization plane-maintaining optical fiber.

FIG. 2 is a schematic sectional constitutional diagram of a section cut orthogonally to a light propagation direction of a PANDA-type optical fiber employed for a polarization plane-maintaining optical fiber.

In FIG. 2, the PANDA-type optical fiber is formed to include a core 142 that guides light, a cladding 140 surrounding the core 142, and stress provision portions 144 that are formed sandwiching the core 142 and have a higher refractive index than the cladding 140.

For example, the cladding is formed of $SiO_2$, the core 142 is formed of $SiO_2$ doped with $GeO_2$, and the stress provision portions 144 are formed of $SiO_2$ doped with $B_2O_3$.

Because the structure is formed as shown in FIG. 2, in a plane orthogonal to the light propagation direction of the PANDA-type optical fiber, an equivalent refractive index for light polarized in the direction of a slow axis and an equivalent refractive index for light polarized in the direction of a fast axis, which intersects the slow axis, are different.

That is, because the stress provision portions 144 are located near the core 142, the equivalent refractive index for light in which the oscillation direction of the electric field vector of the light is parallel to the direction of the slow axis is higher than the equivalent refractive index for light in which the oscillation direction of the electric field vector of the light is parallel to the direction of the fast axis.

Because there is this asymmetricality in the equivalent refractive index, a polarization plane of light input into the PANDA-type optical fiber is maintained while being propagated. That is, in a PANDA-type optical fiber, if the polarization plane of light with a linear polarization matches the slow axis (or fast axis) shown in FIG. 2 at input, the light is propagated in the PANDA-type optical fiber with the polarization state maintained as is, and at the emission end too the polarization plane matches the slow axis (or fast axis). Therefore, linearly polarized light components alone may be obtained.

In the first exemplary embodiment, for convenience of explanation, polarization directions of light being propagated in the polarization plane-maintaining optical fibers in the schematic diagram of the optical modulator shown in FIG. 1, which are light transmission paths, are restricted as follows.

Polarized light in which the oscillation direction of the electric field vector of the light is parallel to the slow axis direction shown in FIG. 2 is referred to as the TE (transverse-electric mode) polarization, and this direction is referred to as the TE direction. Furthermore, polarized light in which the oscillation direction of the electric field vector of the light is parallel to the fast axis direction intersecting the slow axis direction is referred to as the TM (transverse-magnetic mode) polarization, and this direction is referred to as the TM direction.

Furthermore, in the first exemplary embodiment, when light is incident on a polarization separation/combination module such as the first polarization separation/combination module 10 or the like, components of the incident light that correspond to oscillation directions of the electric field vectors with respect to a polarization plane selective reflection surface of the polarization separation/combination module are defined as follows.

A component of which the electric field vector oscillates in a direction parallel to an incidence plane of incident light that is incident on the polarization plane selective reflection surface is referred to as a p component, and a component of which the electric field vector oscillates in a direction orthogonal to the incidence plane of the incident light is referred to as an s component.

For example, when light is incident on the first polarization separation/combination module 10, a component of which the electric field vector oscillates in a direction parallel to the incidence plane with respect to a polarization plane selective reflection surface 10R, of a polarization separation/combination element structuring the first polarization separation/combination module 10, is the p component, and a component of which the electric field vector oscillates in a direction orthogonal to the incidence plane of the incident light is the s component. The same also applies at the second polarization separation/combination module 18.

At the first polarization separation/combination module 10, a p polarization component input through the first input/output terminal 10-1 is output to the second input/output terminal 10-2, and an s polarization component input through the second input/output terminal 10-2 is output to the third input/output terminal 10-3. Further, at the first polarization separation/combination module 10, a p polarization component input through the second input/output terminal 10-2 is output to the first input/output terminal 10-1.

Next, the optical communication of the input/output terminals of the first and second polarization separation/combination modules 10 and 18 with the input/output ends of the respective polarization plane-maintaining optical fibers will be described.

The input/output terminals with which the first and second polarization separation/combination modules 10 and 18 are provided and the input/output, ends of the first to fourth polarization plane-maintaining optical fibers 12, 16, 22 and 26 are coupled such that the polarization direction of a p wave or s wave in the respective polarization separation/combination module 10 or 18 matches up with the direction of the slow or fast axis of the respective polarization plane-maintaining optical fiber 12, 16, 22 or 26.

For convenience in the following descriptions, descriptions will be given with the polarization directions of p waves in the polarization separation/combination modules 10 and 18 coinciding with the slow axis directions of the polarization plane-maintaining optical fibers 12, 16, 22 and 26. Naturally, the above-described case is not a limitation; the present invention may also be realized with any coupling location being coupled such that the polarization direction of p waves in the polarization separation/combination module matches up with the direction of the fast axis of the polarization plane-maintaining optical fiber.

Next, a method of the optical communication of an end portion of the third polarization plane-maintaining optical fiber 22 with an end portion of the fourth polarization plane-maintaining optical fiber 26 at the first polarization plane conversion portion 24 will be described.

FIG. 3A and FIG. 3B are explanatory diagrams describing the optical communication method at the first polarization plane conversion portion 24. FIG. 3B is a sectional view showing a cross-section of the optical communication between the third polarization plane-maintaining optical fiber 22 and the fourth polarization plane-maintaining optical fiber 26 at the first polarization plane conversion portion 24, and FIG. 3A is respective sectional views of the third polarization plane-maintaining optical fiber 22 and the fourth polarization plane-maintaining optical fiber 26.

As shown in FIG. 3A and FIG. 3B, at the first polarization plane conversion portion 24, the third polarization plane-maintaining optical fiber 22 and the fourth polarization plane-maintaining optical fiber 26 optically communicate in a form in which the slow axes of end faces 176 and 174 thereof are rotated by 90° with respect to one another. In other words, the third polarization plane-maintaining optical fiber 22 and the fourth polarization plane-maintaining optical fiber 26 optically communicate such that the slow axis of each is parallel with the fast axis of the other. Such an optical communication can be implemented by a simple method such as a fiber adapter, a fused connection or the like.

As another optical communication method, optical communication may be such that the slow axis of the end face of the third polarization plane-maintaining optical fiber 22 matches the slow axis of the end face of the fourth polarization plane-maintaining optical fiber 26. However, in such a case, for example, a half-wavelength plate or the like is provided at the coupling portion.

Next, coupling of an end face of the first polarization plane-maintaining optical fiber 12, which optically communicates with the half-wavelength plate 14, to an end face of the second polarization plane-maintaining optical fiber 16 will be described.

FIG. 4 is explanatory diagrams describing states of polarization of signal light during phase-modulated optical signal generation. In FIG. 4, cross-sections of optical communication at the half-wavelength plate 14, of the end face of the first polarization plane-maintaining optical fiber 12 and the end face of the second polarization plane-maintaining optical fiber 16, are shown. In FIG. 4, states of polarization of signal light during phase-modulated optical signal generation are described; this will be described in more detail in a section on operations.

As shown in FIG. 4, the slow axis direction of the first polarization plane-maintaining optical fiber 12 and the slow axis direction of the second polarization plane-maintaining optical fiber 16, which optically communicate to the half-wavelength plate 14, are adjusted so as to match up. The direction of an optical axis of the half-wavelength plate 14 is adjustable, as will be described in the section on operations.

In the case of a situation such that, as described above, the coupling location of a polarization separation/combination module and a polarization plane-maintaining optical fiber includes a portion at which the p polarization direction and the fast axis match up with one another, opposing fiber end faces of the first polarization plane-maintaining optical fiber 12 and the second polarization plane-maintaining optical fiber 16 may be adjusted such that the slow axes match up with the fast axes. In such a case too, the present invention can be realized.

The length of a path reaching from the second input/output terminal 10-2 of the first polarization separation/combination module 10 to the half-wavelength plate 14, which is to say the length of the first polarization plane-maintaining optical fiber 12, is set to l1 (also referred to as path L1). The length of a path reaching from the half-wavelength plate 14 to the first input/output terminal 18-1 of the second polarization separation/combination module 18, which is to say the length of the second polarization plane-maintaining optical fiber 16, is set to l2 (also referred to as path L2). The length of a path reaching from the second input/output terminal 18-2 of the second polarization separation/combination module 18 to the first polarization plane conversion portion 24, which is to say the length of the third polarization plane-maintaining optical fiber 22, is set to l3 (also referred to as path L3). The length of a path reaching from the first polarization plane conversion portion 24 to the third input/output terminal 18-3 of the second polarization separation/combination module 18, which is to say the length of the fourth polarization plane-maintaining optical fiber 26, is set to l4 (also referred to as path L4).

In the third polarization plane-maintaining optical fiber 22 or the fourth polarization plane-maintaining optical fiber 26, or both, a phase shift is caused in signal light with wavelength $\lambda s$, which is controlled light, by a cross phase modulation effect due to an optical Kerr effect caused by control light with wavelength $\lambda p$.

The occurrence of the optical Kerr effect does not especially contribute to the generation of the phase shift, and the effects of the present invention may be obtained even if any one of the first polarization plane-maintaining optical fiber 12, the second polarization plane-maintaining optical fiber 16, the third polarization plane-maintaining optical fiber 22 and the fourth polarization plane-maintaining optical fiber 26 is not an optical fiber but a spatial optical system.

Operation of the First Exemplary Embodiment

Next, processing in the optical modulator 1A of the first exemplary embodiment will be described in detail with reference to the drawings.

In FIG. 1, signal light, which is controlled light with wavelength $\lambda s$, is input into the signal light input optical fiber 32-2 and reaches the first input/output terminal 10-1 of the first polarization separation/combination module 10.

Here, the signal light is an "optical pulse train", in which optical pulses of which peak intensities are aligned are arranged at equal time intervals. A pulse timing interval of the signal light is the reciprocal of the bit rate of a desired modulated optical signal. For example, in a case in which a modulated light signal of 10 Gbit/s is desired, the pulse timing interval of the signal light that is the optical pulse train is 100 ps.

The polarization direction of the signal light reaching the first input/output terminal 10-1 of the first polarization separation/combination module 10 has been adjusted so as to be parallel with the p polarization component of the first polarization separation/combination module 10. As a result, the signal light is output from the second input/output terminal 10-2 of the first polarization separation/combination module 10, as linearly polarized light.

Thereafter, the signal light is propagated in the first polarization plane-maintaining optical fiber 12 and reaches the half-wavelength plate 14. Here, the signal light is propagated as linearly polarized light parallel with the slow axis of the first polarization plane-maintaining optical fiber 12.

Now, as described above, the respective opposing fiber end faces of the first polarization plane-maintaining optical fiber 12 and the second polarization plane-maintaining optical fiber 16 at the half-wavelength plate 14 are adjusted such that the slow axis directions match up. In the first exemplary embodiment, switching of a modulation format of a modulated light signal that is eventually desired (a phase modulation system or an amplitude modulation system) is possible, by rotating the optical axis direction of the half-wavelength plate 14.

Herebelow, these operations are described.

Case 1: Output of Phase-Modulated Light

Firstly, a case in which the data format of the eventually desired modulated optical signal is a phase-modulated signal will be described.

In this case, the optical axes of the half-wavelength plate 14 are adjusted such that either optical axis of the half-wavelength plate 14 matches up with the slow axes of the first polarization plane-maintaining optical fiber 12 and the second polarization plane-maintaining optical fiber 16.

Figures 4A, 4B, 4C:
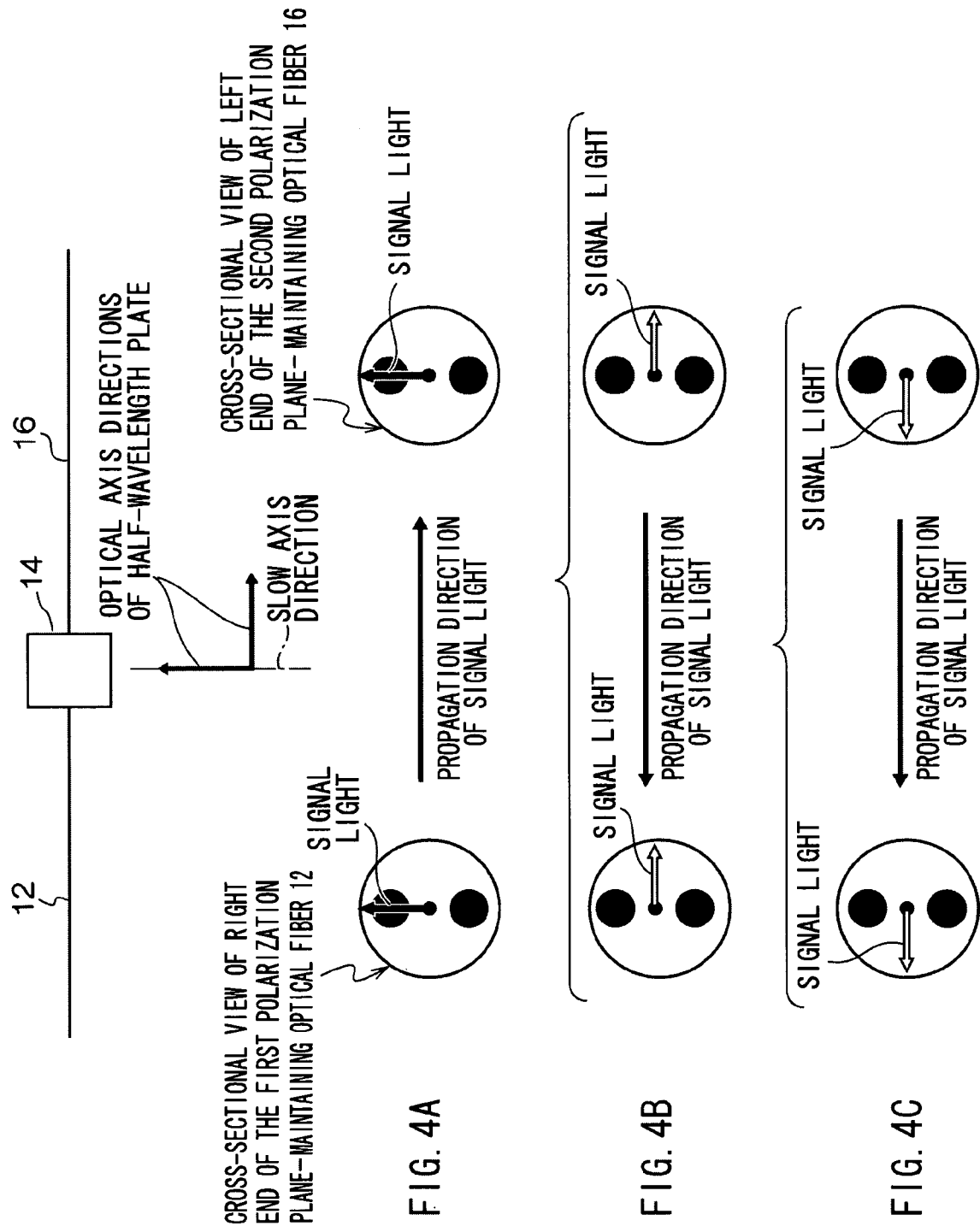
FIG. 4A to FIG. 4C are explanatory diagrams describing states of polarization of signal light during phase-modulated optical signal generation in the first exemplary embodiment.

At this time, the polarization direction of signal light that is output through the half-wavelength plate 14 and optically communicates with the second polarization plane-maintaining optical fiber 16 is a linear polarization matching the polarization direction of the slow axis of the second polarization plane-maintaining optical fiber 16 (see FIG. 4A).

Hence, the signal light is propagated in the second polarization plane-maintaining optical fiber 16 with a linear polarization parallel to the slow axis thereof, and is input into the first input/output terminal 18-1 of the second polarization separation/combination module 18.

The signal light being input into the first input/output terminal 18-1 of the second polarization separation/combination module 18 only has the the p polarization component. Therefore, all of the signal light is output to the second input/output terminal 18-2 and provided to the third polarization plane-maintaining optical fiber 22.

Hence, the signal light passes through the first optical coupler 20, is propagated through the third polarization plane-maintaining optical fiber 22 with a linear polarization parallel to the slow axis of the third polarization plane-maintaining optical fiber 22, then passes through the first polarization plane conversion portion 24 ("A"), and is propagated through the fourth polarization plane-maintaining optical fiber 26 with a linear polarization parallel to the fast axis of the fourth polarization plane-maintaining optical fiber 26.

Then, because the polarization direction of the signal light, which is input into the third input/output terminal 18-3 of the second polarization separation/combination module 18, is the s polarization direction, the signal light is output from the first input/output terminal 18-1 of the second polarization separation/combination module 18.

The signal light output from the first input/output terminal 18-1 of the second polarization separation/combination module 18 passes through the second polarization plane-maintaining optical fiber 16 with a linear polarization in a polarization direction matching the fast axis of the second polarization plane-maintaining optical fiber 16, and passes through the half-wavelength plate 14.

The signal light is propagated through the first polarization plane-maintaining optical fiber 12 with a linear polarization parallel to the fast axis of the first polarization plane-maintaining optical fiber 12, and reaches the second input/output terminal 10-2 of the first polarization separation/combination module 10. Because this signal light is in the s polarization direction, the signal light is output from the third input/output terminal 10-3 of the first polarization separation/combination module 10.

Here, the signal light output from the third input/output terminal 10-3 of the first polarization separation/combination module 10 is a phase-modulated optical signal that has been phase-modulated by the control light. Why it is a phase-modulated signal will be described in detail hereafter.

This phase-modulated optical signal passes through the converted light signal output optical fiber 27 coupled to the third input/output terminal 10-3 of the first polarization separation/combination module 10, and is input into the optical band-pass filter 28.

The optical band-pass filter 28 selectively transmits only a signal light wavelength component with the wavelength $\lambda s$, and blocks a control light component with the wavelength $\lambda p$. Therefore, when the phase-modulated signal light passes through the optical band-pass filter 28, the light component with wavelength $\lambda p$ is blocked and the light component with wavelength $\lambda s$ is output to the output optical fiber 29. Thus, the eventually desired phase-modulated optical signal is output.

Meanwhile, the control light with wavelength $\lambda p$, which is encoded in an amplitude modulation system, is input through the control light input/output port 31, passes through the first optical coupler 20 and is input into the third polarization plane-maintaining optical fiber 22.

Here, the polarization plane of the control light is adjusted and input such that the control light is linearly polarized light parallel to the slow axis of the third polarization plane-maintaining optical fiber 22. Further, delay times of control light pulse signals or the signal light are adjusted such that when individual optical pulse signals included in the control light are input into the third polarization plane-maintaining optical fiber 22, the individual optical pulse signals included in the control light temporally coincide with individual optical pulses included in the signal light. Alternatively, at both or either of the third polarization plane-maintaining optical fiber 22 and the fourth polarization plane-maintaining optical fiber 26 in which the optical Kerr effect is produced, when there is a walk-off effect between the control light and the signal light due to group velocity dispersion, the control light and signal light may be input with a slight offset provided between an optical pulse position of the control light and an optical pulse position of the signal light, in order to maximize the cross phase modulation effect caused by the optical Kerr effect.

Herein, for the sake of convenience, operations are described herebelow with the desired phase-modulated optical signal being a phase-modulated signal in which a signal "zero" corresponds to an optical phase of 0 and a signal "one" corresponds to an optical phase of $\pi$.

Similarly for the sake of convenience, the amplitude-modulated control signal is an amplitude-modulated signal in which a peak intensity corresponding to a signal one is 1 whereas a peak intensity corresponding to a zero signal is extremely close to 0 and the extinction ratio is infinite. This kind of amplitude-modulated signal may be referred to as an on-off keying signal.

When the control signal is a zero, the signal light does not undergo a phase shift due to cross phase modulation. In this state, the signal light is a phase-modulated signal with optical phase 0.

Herein, the vector notation shown in FIG. 4 is used in order to conveniently represent the polarization directions and optical phase states of optical signals.

Thus, the signal light passes through the closed loop constituted by the second polarization separation/combination module 18, the third polarization plane-maintaining optical fiber 22 and the fourth polarization plane-maintaining optical fiber 26, and passes through the second polarization plane-maintaining optical fiber 16. The polarization direction and optical phase of the signal light (phase-modulated light) upon reaching the left end of the second polarization plane-maintaining optical fiber 16 just before entering the half-wavelength plate 14 are considered.

Firstly, in a case in which the control signal is a zero, because the polarization direction of the phase-modulated light is parallel to the fast axis and the optical phase is 0, the polarization and optical phase state of this optical signal is, as shown in FIG. 4B, indicated by an arrow to the right.

In a case in which the control signal is a one, the signal light is subjected to a phase shift due to cross phase modulation with the control light. The peak intensity of the control light is adjusted such that a total amount of phase-shifting in the third polarization plane-maintaining optical fiber 22 and the fourth polarization plane-maintaining optical fiber 26 is $\pi$.

The signal light is input into the signal light input optical fiber 32-2, passes through the closed loop constituted by the second polarization separation/combination module 18, the third polarization plane-maintaining optical fiber 22 and the fourth polarization plane-maintaining optical fiber 26, passes through the second polarization plane-maintaining optical fiber 16, and is input into the half-wavelength plate 14. Light paths and polarization states in the light paths until reaching the left end of the second polarization plane-maintaining optical fiber 16 just before entering the half-wavelength plate 14 do not change in relation to whether the control signal is a one or a zero.

Therefore, until reaching the left end of the second polarization plane-maintaining optical fiber 16, the only factor by which the optical phase varies corresponds to the phase shift caused by the cross phase modulation effect with the control light.

Accordingly, when the control signal is a one, the polarization direction of the phase-modulated light is parallel to the fast axis and the optical phase of the phase-modulated light is $\pi$. Therefore, the polarization and optical phase state of the light signal are as indicated by the leftward arrow shown in FIG. 4C.

Furthermore, the optical signal is output through the left end of the second polarization plane-maintaining optical fiber 16, passes through the half-wavelength plate 14, the first polarization plane-maintaining optical fiber 12 and so forth, and is output through the output optical fiber 29. Until being output through the output optical fiber 29, light paths and polarization states passing through the light paths do not change in relation to whether the control signal is a one or a zero. Thus, additional phase shifts due to the control signal being a one or a zero do not occur while the optical signal passes along these paths.

Thus, by the operations described above, a phase-modulated optical signal is output from the output optical fiber 29 with the optical phase thereof encoded to $\pi$ or 0 corresponding to whether the control signal is one or zero.

Case 2: Output of Amplitude-Modulated Light

Next, a case in which the data format of the eventually desired modulated optical signal is an amplitude-modulated signal will be described.

FIG. 5 is explanatory diagrams describing states of polarization of signal light during amplitude-modulated optical signal generation.

As shown in FIG. 5, in this case, either one of the optical axes of the half-wavelength plate 14 is adjusted so as to be disposed at an angle of 22.5° from the slow axis of the first polarization plane-maintaining optical fiber 12.

Figures 5A, 5B, 5C:
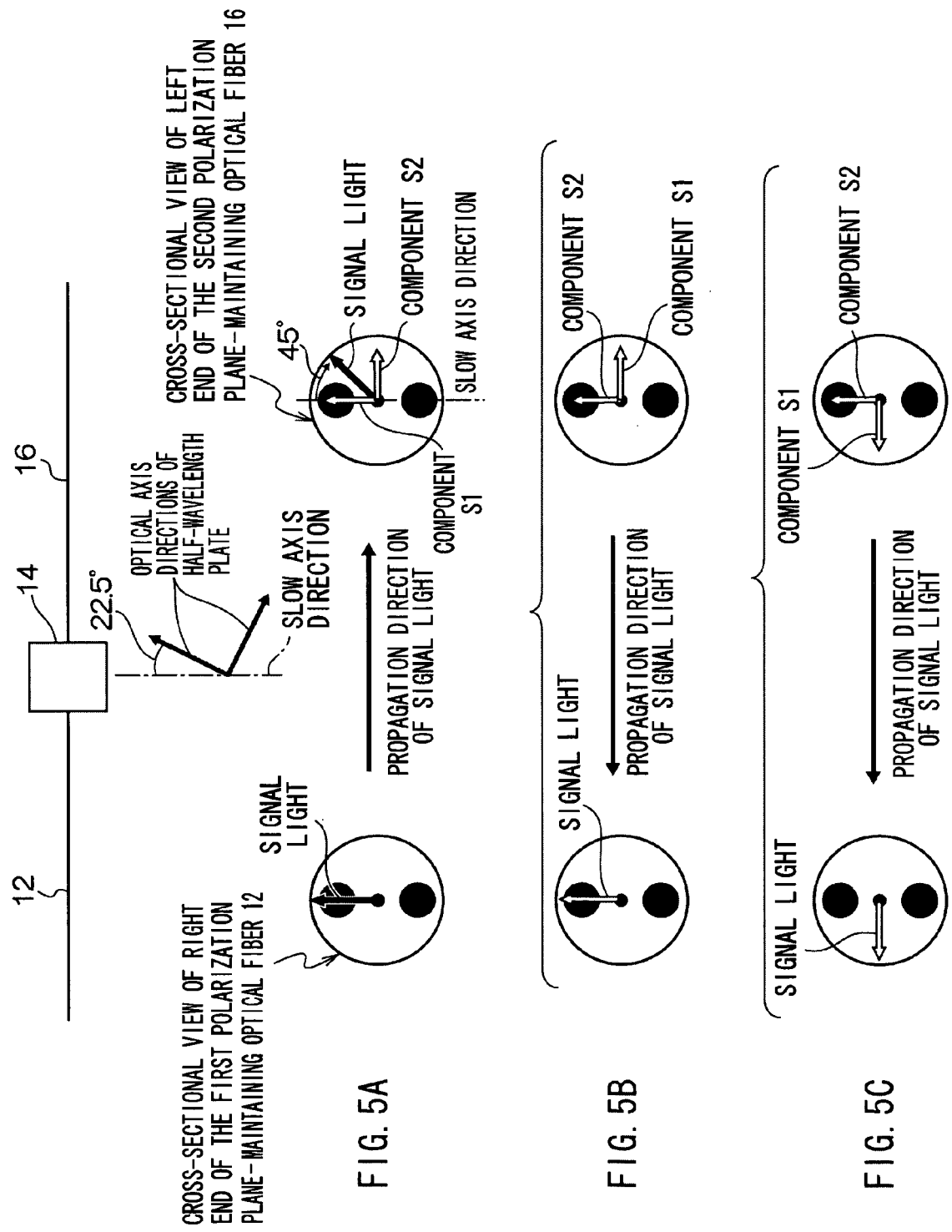
FIG. 5A to FIG. 5C are explanatory diagrams describing states of polarization of signal light during amplitude-modulated optical signal generation in the first exemplary embodiment.

Here, the polarization direction of signal light output from the half-wavelength plate 14 and linked into the second polarization plane-maintaining optical fiber 16 is a linear polarization angled at 45° to the slow axis of the second polarization plane-maintaining optical fiber 16 (see FIG. 5A).

Hence, the signal light is propagated in the second polarization plane-maintaining optical fiber 16 with a linear polarization component parallel to the slow axis thereof and a linear polarization component parallel to the fast axis, and is input into the first input/output terminal 18-1 of the second polarization separation/combination module 18.

Herein, the above-mentioned linear polarization component of the signal light that is parallel to the slow axis is defined as component S1, and the linear polarization component of the signal light that is parallel to the fast axis is defined as component S2.

Because the polarization direction of the signal light that is linearly polarized light linking into the second polarization plane-maintaining optical fiber 16 is angled at 45° to the slow axis of the second polarization plane-maintaining optical fiber 16, an intensity ratio of component S1 and component S2 is 1:1.

Similarly to case 1, upon being input into the left end of the second polarization plane-maintaining optical fiber 16, the polarization directions of component S1 and components S2 are as in FIG. 5A if the optical phases are represented by vectors.

That is, component S1 is represented by a upward arrow parallel to the slow axis, and component S2 is represented by a rightward arrow parallel to the fast axis.

Hence, because the polarization direction of component S1 is the p polarization direction, component S1 is output from the second input/output terminal 18-2 of the second polarization separation/combination module 18, and is propagated through the third polarization plane-maintaining optical fiber 22 as linearly polarized light parallel to the slow axis of the third polarization plane-maintaining optical fiber 22.

Then component S1 passes through the first polarization plane conversion portion 24 ("A"), is propagated through the fourth polarization plane-maintaining optical fiber 26 as linearly polarized light parallel to the fast axis of the fourth polarization plane-maintaining optical fiber 26, and is input into the third input/output terminal 18-3 of the second polarization separation/combination module 18.

Because the polarization direction of component S1 is thus the s polarization direction, component S1 is output from the first input/output terminal 18-1 of the second polarization separation/combination module 18, passes through the second polarization plane-maintaining optical fiber 16 as linearly polarized light with a polarization direction matching the fast axis of the second polarization plane-maintaining optical fiber 16, and reaches the left end of the second polarization plane-maintaining optical fiber 16.

Meanwhile, because the polarization direction of component S2 is the s polarization direction, component S2 is output from the third input/output terminal 18-3 of the second polarization separation/combination module 18, and is propagated through the fourth polarization plane-maintaining optical fiber 26 as linearly polarized light parallel to the fast axis of the fourth polarization plane-maintaining optical fiber 26.

Then component S2 passes through the first polarization plane conversion portion 24 ("A"), is propagated through the third polarization plane-maintaining optical fiber 22 as linearly polarized light parallel to the slow axis of the third polarization plane-maintaining optical fiber 22, and is input into the second input/output terminal 18-2 of the second polarization separation/combination module 18.

Because the polarization direction of component S2 is thus the p polarization direction, component S2 is output from the first input/output terminal 18-1 of the second polarization separation/combination module 18, passes through the second polarization plane-maintaining optical fiber 16 as linearly polarized light with a polarization direction matching the slow axis of the second polarization plane-maintaining optical fiber 16, and reaches the left end of the second polarization plane-maintaining optical fiber 16.

Here, a case in which the same signal light as in case 1 is input through the first optical coupler 20 is considered. This signal light similarly has the same peak intensity and the same extinction ratio as in case 1 and timing positions of pulse signals are exactly the same, meaning that a delay time significantly different to case 1 is not provided.

In a case in which the control light is a zero signal, neither component S1 nor component S2 undergoes a phase shift due to cross phase modulation with the control light. At this time, component S1 and component S2 are input from the left end of the second polarization plane-maintaining optical fiber 16, pass through the closed loop constituted by the second polarization separation/combination module 18, the third polarization plane-maintaining optical fiber 22 and the fourth polarization plane-maintaining optical fiber 26, and again reach the left end of the second polarization plane-maintaining optical fiber 16. Light path lengths until again reaching the left end of the second polarization plane-maintaining optical fiber 16 are considered. A light path length means a value in which the refractive index is multiplied by the physical length of an optical medium such as an optical fiber or the like. Now, the total light path length that component S1 passes along is provided by:

$$n_s l2 + n_s l3 + n_f l4 + n_f l2 \quad (1)$$

And the total light path length that component S2 passes along is provided by:

$$n_f l2 + n_f l4 + n_s l3 + n_s l2 \quad (2)$$

Here, $n_s$ is the slow axis refractive index of a polarization plane-maintaining fiber and $n_f$ is the fast axis refractive index.

From equations (1) and (2), it is seen that the light path lengths are exactly the same from component S1 and component S2 being input from the left end of the second polarization plane-maintaining optical fiber 16 to again reaching the left end of the second polarization plane-maintaining optical fiber 16.

Thus, in a case in which the control light is a zero signal, no relative difference in optical phase between component S1 and component S2 arises before they again reach the left end of the second polarization plane-maintaining optical fiber 16. Therefore, a vector representation of component S1 and component S2 when they again reach the left end of the second polarization plane-maintaining optical fiber 16 is the same as the representation shown in FIG. 5A, being represented as an upward arrow and a rightward arrow (FIG. 5B).

However, the polarization direction of component S1 is the direction parallel to the fast axis and the polarization direction of component S2 is the direction parallel to the slow axis. Therefore, the polarization directions have swapped places with one another relative to the state shown in FIG. 5A for the time of input into the left end of the second polarization plane-maintaining optical fiber 16.

Thereafter, the components S1 and S2 pass through the half-wavelength plate 14 and, upon reaching the right end of the first polarization plane-maintaining optical fiber 12, the signal light into which component S1 and component S2 can be re-coupled is linearly polarized light parallel to the slow axis of the first polarization plane-maintaining optical fiber 12 (FIG. 5B).

The signal light is again input into the second input/output terminal 10-2 of the first polarization separation/combination module 10. Because the polarization direction thereof is the p polarization direction, the signal light is output from the first input/output terminal 10-1. That is, the signal light is not output to the third input/output terminal 10-3.

On the other hand, in a case in which the control light is a one signal, similarly to the operation of case 1, a phase shift of π arises in component S1, which is propagated in the same direction as the control light, due to cross phase modulation with the control light.

Meanwhile, component S2, which is propagated the opposite way to the control light, undergoes a phase shift due to cross phase modulation with the control light that is small enough to be disregarded. Accordingly, the first exemplary embodiment is described with it being assumed for this case that the phase shift due to cross phase modulation with the control light is small enough to be disregarded.

Here, because an optical phase shift of π arises in component S2 relative to component S1, the vector representation of component S1 and component S2 when the components again reach the left end of the second polarization plane-maintaining optical fiber 16 is represented as in FIG. 5C.

That is, component S2, the same as in the case in FIG. 5B, is represented as an upward arrow, whereas component S1, oppositely to the case in FIG. 5B, is represented as a leftward arrow (FIG. 5C).

Hence, components S1 and S2 pass through the half-wavelength plate 14 and, upon reaching the right end of the first polarization plane-maintaining optical fiber 12, the signal light into which component S1 and component S2 can be re-coupled is linearly polarized light parallel to the fast axis of the first polarization plane-maintaining optical fiber 12 (FIG. 5C).

Thereafter, the signal light is input into the second input/output terminal 10-2 of the first polarization separation/combination module 10 and, because the polarization direction thereof is the s polarization direction, is output from the third input/output terminal 10-3. Hence, similarly to case 1, the signal light passes through the output optical fiber 27 and the optical band-pass filter 28, and is output through the output optical fiber 29.

As described above, in these cases, the signal light is output from the third input/output terminal 10-3 of the first polarization separation/combination module 10, and consequently output through the output optical fiber 29, only if the control light is a one signal.

Thus, a peak intensity from the output optical fiber 29 is modulated in correspondence with whether the control signal is a one or a zero, and an amplitude-modulated signal is output. In the case of this example, when the control signal is a zero, the signal light is not output at all. Thus, an "on-off keying signal" is output.

Pulse waveforms of the modulated optical signals that are generated in the phase modulation format of case 1 and the amplitude modulation format of case 2 as described above will be considered.

In either of the formats, the light paths along which the signal light passes are the same. Therefore, insertion losses are the same, and factors causing waveform distortion, such as group velocity dispersion and the like, are the same. Therefore, waveform distortion is the same.

In the phase modulation format, input and output of the signal light at the apparatus are implemented without any interference effects occurring. On the other hand, in the amplitude modulation format, the signal light is divided into component S1 and component S2 and propagated, but eventually, upon being re-coupled when being input to the right end of the first polarization plane-maintaining optical fiber 12, the components are coupled in matching phases. Therefore, energy losses do not occur. In other words, although there are interference effects, there are no corresponding energy losses.

Therefore, in both formats, the peak intensity of the modulated optical signal (the peak intensity for a one signal in the case of amplitude modulation) is the same.

As has been described hereabove, in the first exemplary embodiment, an all-optical optical modulator can be provided that is capable of generating optical signals in formats of both phase modulation and amplitude modulation by a simple measure, meaning an adjustment to rotate the optical axis direction of the half-wavelength plate 14. There is no need to alter a peak intensity of control light, timing positions of optical pulses or the like in accordance with switching of the modulation format. Nor is there any change in the peak intensity of the modulated optical signal that is generated (in the case of an amplitude-modulated signal, the peak intensity of a "one" signal).

Furthermore, the apparatus has a constitution in which birefringences of the polarization plane-maintaining fibers structuring the apparatus automatically cancel out as shown in equations (1) and (2). This is particularly useful in the case of the amplitude modulation format in which component S1 and component S2 are both present and interference therebetween is utilized. Thus, high-precision regulation of lengths of the polarization plane-maintaining fibers in order to cancel out birefringence, as illustrated in "Ultrafast Optical multi/demultiplexer utilizing optical Kerr effect in polarization-maintaining single-mode fibers", T. Morioka, M. Saruwatari and A. Takada, Electronic Letters, Vol. 23, No. 9 pp. 453-454, 1987, is not required.

Moreover, polarization cross-talk components that arise in the third polarization plane-maintaining optical fiber 22 and the first polarization plane conversion portion 24 are wholly output at the fourth input/output terminal 18-4 of the second polarization separation/combination module 18, which does not need to be coupled to an optical fiber or the like. This is because, similarly to a case in Japanese Patent Application Laid-Open (JP-A) No. 2006-58508, a polarization cross-talk component in the case of the phase modulation format is input to the third input/output terminal 18-3 of the second polarization separation/combination module 18 as a p polarization component, and in the case of the amplitude modulation format, a polarization cross-talk component of component S1 is input to the third input/output terminal 18-3 of the second polarization separation/combination module 18 as a p polarization component and a polarization cross-talk component of component S2 is input to the second input/output terminal 18-2 of the second polarization separation/combination module 18 as an s polarization component. Therefore, polarization cross-talk components arising in the third polarization plane-maintaining optical fiber 22 and the fourth polarization plane-maintaining optical fiber 26 will not be mixed with the actually desired modulated optical signal and output at the third input/output terminal 10-3 of the first polarization separation/combination module 10.

Therefore, even if the third polarization plane-maintaining optical fiber 22 and fourth polarization plane-maintaining optical fiber 26 that are used are long and thin in order to moderate the peak intensity of the control light, similarly to JP-A No. 2006-58508, occurrences of operational instability due to polarization cross-talk arising in these fibers can be suppressed.

From the above, in the first exemplary embodiment, the influence of birefringence due to the use of polarization plane-maintaining fibers, operational instability of optical modulation operations due to occurrences of polarization cross-talk, and the like may be suppressed. Thus, an all-optical optical modulator can be provided whose characteristics do not change even when a signal light path length or environmental temperature changes, and highly stable operational characteristics are assured.

In the above descriptions, for convenience of explanation, descriptions have been given assuming that the phase is modulated between 0 and π in phase-modulated signal generation and that the peak intensity is modulated between 0 and 1 (an on-off keying signal) in amplitude modulation signal generation. However, signal formats of the optical modulator that can be realized by the first exemplary embodiment are not limited to the above. For example, if the control signal is an on-off keying signal with peak intensities of 0 and 1 and the control light peak power is adjusted such that the phase shift due to the cross phase modulation effect is 0.5π, phase modulation signal generation in which the optical phase is modulated between 0 and π is possible. In such a case, the control light may be an amplitude-modulated signal with peak intensities of 0.5 and 1. Further, if the control light is an amplitude-modulated signal with peak intensities of 0.5 and 1, an amplitude-modulated signal with peak intensities of 0.5 and 1 may be generated. Further yet, phase-modulated signals and amplitude-modulated signals with various optical phase relationships and peak intensity ratios may be generated by suitably adjusting the peak intensity of the control light and the like.

In the case in which an amplitude-modulated signal is generated as the modulated optical signal, an amplitude-modulated signal that is a logical inversion of the desired amplitude-modulated signal, which is output through the output optical fiber 29, is simultaneously output through the signal light input optical fiber 32-2 in a form that is propagated in the opposite direction to the signal light. This logically inverted signal may be used as a monitor of signal quality of the desired positive logic amplitude-modulated signal, or the like. In such a case, the 3-port optical circulator 30 optically communicates to the signal light input end of the signal light input optical fiber 32-2.

The 3-port optical circulator 30 has the optical fibers 32-1, 32-2 and 37 which are optically communicate to the respective input/output ports thereof. The signal light input through the signal light input optical fiber 32-1 is output through the signal light input optical fiber 32-2. The other end of the signal light input optical fiber 32-2 optically communicates to the first input/output terminal 10-1 of the first polarization separation/combination module 10. The signal light that is to be input to the first input/output terminal 10-1 of the first polarization separation/combination module 10 is adjusted in polarization direction so as to be linearly polarized light parallel to the p polarization component. On the other hand, the logically inverted amplitude-modulated signal is output from the first input/output terminal 10-1 of the first polarization separation/combination module 10, is input into the signal light input optical fiber 32-2, and is output through the optical fiber 37. Similarly to the case of the desired positive logic amplitude-modulated optical signal, only a signal light wavelength component that passes through the optical band-pass filter 38 is output through the output optical fiber 39 to serve as a logically inverted amplitude-modulated optical signal.

According to the first exemplary embodiment, an all-optical optical intensity/phase modulator may be provided that is capable, using a single apparatus, of generating optical signals in formats of both an amplitude modulation system and a phase modulation system by a simple measure, which is rotation of the optical axis direction of a half-wavelength plate.

Moreover, according to the first exemplary embodiment, a significant change in pulse waveform, peak intensity or the like or optical signal quality of the modulated optical signal does not result from a change of the modulation format.

According to the first exemplary embodiment, adjustments of peak intensity, delay times and the like of control light in accordance with changes of modulation format are not required.

Furthermore, according to the first exemplary embodiment, characteristics do not change even if a signal light path length or environmental temperature changes, and highly stable operational characteristics can be assured.

Second Exemplary Embodiment

Next, a second exemplary embodiment of the optical modulator of the present invention will be described in detail while referring to the drawings.

For the first exemplary embodiment, in the description of when the all-optical optical modulator is being operated in the amplitude modulation format, a case is exemplified in which a phase shift caused by the cross phase modulation effect in component S2, which is propagated in the opposite direction to the control light, is treated as an issue to be disregarded.

This treatment is effective in cases in which a duty ratio of the control light, which is defined as a value in which the pulse width thereof is divided by the pulse period, is small.

However, when the duty ratio is larger, a phase shift caused by the cross phase modulation effect on component S2 becomes significant and cannot be disregarded.

Accordingly, for the second exemplary embodiment, an exemplary embodiment of the all-optical optical modulator that takes account of the phase shift caused to component S2 by the cross phase modulation effect will be described.

Structure of the Second Exemplary Embodiment

FIG. 6 is a diagram showing a structure of an optical modulator 1B of the second exemplary embodiment.

The structure of the optical modulator 1B of the second exemplary embodiment differs from the structure of the optical modulator 1A of the first exemplary embodiment in that an optical phase biasing circuit 40 is provided at some position on the light path from the second input/output terminal 18-2 of the second polarization separation/combination module 18 to the third polarization plane-maintaining optical fiber 22, the first polarization plane conversion portion 24, the fourth polarization plane-maintaining optical fiber 26 and the third input/output terminal 18-3 of the second polarization separation/combination module 18.

Other structures are the same as the structures described for the first exemplary embodiment, so detailed descriptions of these structures will not be given.

The optical phase biasing circuit 40 is disposed on the fourth polarization plane-maintaining optical fiber 26, between the first polarization plane conversion portion 24 and the third input/output terminal 18-3 of the second polarization separation/combination module 18. Herein, a position of arrangement of the optical phase biasing circuit 40 is not limited to the location shown in FIG. 6; the optical phase biasing circuit 40 may be disposed at any position on the closed loop light path.

Figure 7:
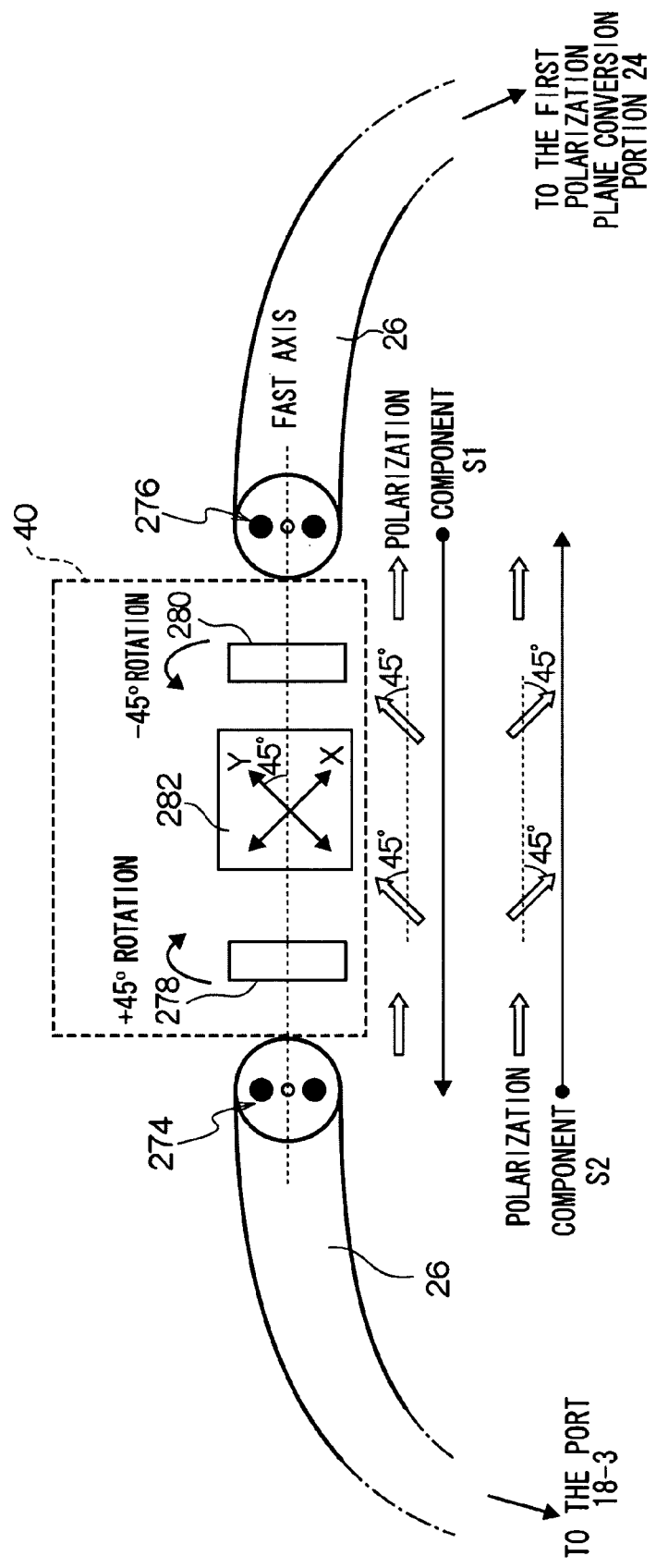
FIG. 7 is a diagram showing a structure of an optical phase biasing circuit of the second exemplary embodiment.

FIG. 7 is a diagram showing the constitution of the optical phase biasing circuit 40. In FIG. 7, the optical phase biasing circuit 40 is structured to include a Faraday rotator 278, which rotates a polarization plane of linearly polarized light by +45°, a Faraday rotator 280, which rotates a polarization plane of linearly polarized light by −45°, and a birefringent medium 282, which has an optical axis X and an optical axis Y Various mediums may be employed as the birefringent medium 282, as long as the medium is capable of realizing the function described herebelow. For example, a polarization plane-maintaining fiber may be used, and an optical crystal having uniaxial or biaxial birefringence may be used. In any case, a phase shift compensation amount may be regulated by regulating a length of the birefringent medium 282. Alternatively, a birefringent medium adjusted to an approximately suitable length may be prepared, and finely adjusted using variations in the birefringence that are caused by temperature changes.

As a further alternative, a "Babinet-Soleil compensator plate" in which birefringent crystals are superposed may be used as the birefringent medium 282. In such a case, the phase shift compensation amount is variable. Therefore, an adaptive-type optical phase biasing circuit that is capable of appropriately responding to changes in the duty ratio of the control light may be structured.

Operation of the Second Exemplary Embodiment

The all-optical optical modulator of the second exemplary embodiment carries out optical modulation operations with consideration for a phase shift caused by a cross phase modulation effect with counter-propagating control light.

In the below-specified Reference A, it is argued that, in an all-optical optical modulator or the like structured with an optical coupler and a closed loop, a phase shift caused by a cross phase modulation effect from opposite-running control light exerts an influence on switching operations of the all-optical optical modulator.

Reference A: S. Arahira, H. Murai, and Y. Ogawa, "Modified NOLM for Stable and Improved 2R Operation at Ultra-High Bit Rates", IEICE Trans. Commun. Vol. E89-B, No. 12, pp. 3296-3305, 2006.

Similarly to the optical modulator described in Reference A, the all-optical optical modulator of the first exemplary embodiment also includes a closed loop architecture, a phase shift is provided by a cross phase modulation effect due to opposite-running control light, and there is an influence on optical modulation results.

In Reference A it is asserted that, if a propagation time required for propagation of control light through one circuit of the loop is significantly larger than a pulse period of the control light (for example, in a case of 10 Gbit/s, the bit period is 100 ps), then the phase shift caused by the cross phase modulation effect from the opposite-running control light has no time dependency, and the phase shift is constant.

Accordingly, in order to produce non-linear effects in such conditions, such effects are brought about in many all-optical optical modulators by an interaction length of a certain degree of length being included. In the optical modulator 1A of the first exemplary embodiment, this is established in a case in which lengths of the third and fourth polarization plane-maintaining optical fibers 22 and 26 (13 and 14) are not very short. In other words, the above-described assumption stands for all-optical optical modulators having practical apparatus structures.

The constant phase shift described above that is caused in component S2 of the signal light in the first exemplary embodiment produces a deterioration of the signal extinction ratio in the amplitude modulation format and a distortion of the modulated signal waveform, as described in Reference A.

Therefore, in order to eliminate this, the second exemplary embodiment has the optical phase biasing circuit 40 included at some location of the closed loop structured by the second polarization separation/combination module 18, the third polarization plane-maintaining optical fiber 22 and the fourth polarization plane-maintaining optical fiber 26, and thus cancels the phase shift caused by the above-mentioned cross phase modulation effect from the opposite-running control light.

In the phase modulation format, in which component S2 is not present, there is no phase shift due to this cross phase modulation effect from opposite-running control light, so a description of operations for the case of the phase modulation format will not be given.

Herebelow, operation of the all-optical optical modulator of the second exemplary embodiment will be described while referring to FIG. 6 and FIG. 7.

Firstly, with FIG. 7, polarization states of component S1 of the signal light when component S1 is propagated through the fourth polarization plane-maintaining optical fiber 26 and optically communicates with the optical phase biasing circuit 40, and then optically communicates with the fourth polarization plane-maintaining optical fiber 26 again, will be described.

As described for the first exemplary embodiment, component S1 is output from the fourth polarization plane-maintaining optical fiber 26, from the right side of FIG. 7, in the form of a linear polarization parallel to the fast axis of the fourth polarization plane-maintaining optical fiber 26, and optically communicates with the optical phase biasing circuit 40.

In the optical phase biasing circuit 40, component S1 first passes through the Faraday rotator 280 and the polarization direction of component Si is rotated by −45°. Herein, the birefringent medium 282 is disposed such that the polarization direction of component S1 whose polarization has been rotated matches one optical axis (the Y axis in FIG. 7) of optical axes of the birefringent medium 282 (an X axis and a Y axis).

After component S1 has passed through the birefringent medium 282, in the form of a linear polarization parallel to an optical axis of the birefringent medium 282 (the Y axis), component S1 enters the Faraday rotator 278. In the Faraday rotator 278, component S1 is rotated by +45°.

Consequently, component S1 reaches the fourth polarization plane-maintaining optical fiber 26 at the left side of FIG. 7 with the polarization direction of component S1 being a linear polarization parallel to the fast axis of the fourth polarization plane-maintaining optical fiber 26, and is propagated further through the fourth polarization plane-maintaining optical fiber 26.

Meanwhile, as described for the first exemplary embodiment, component S2 is output from the fourth polarization plane-maintaining optical fiber 26 at the left side of FIG. 7, in the form of a linear polarization parallel to the fast axis of the fourth polarization plane-maintaining optical fiber 26, and reaches the optical phase biasing circuit 40.

In the optical phase biasing circuit 40, component S2 first passes through the Faraday rotator 278 and the polarization direction thereof is rotated by +45°. This time, the polarization direction of component S2 whose polarization has been rotated matches the optical axis direction of the X axis of the birefringent medium 282.

Therefore, component S2 passes through the birefringent medium 282 in the form of a linear polarization parallel to the X axis of the birefringent medium 282, and enters the Faraday rotator 280. In the Faraday rotator 280, component S2 is rotated by −45°.

Consequently, component S2 reaches the fourth polarization plane-maintaining optical fiber 26 at the right side of FIG. 7, with the polarization direction of component S2 being a linear polarization parallel to the fast axis of the fourth polarization plane-maintaining optical fiber 26 at the right side of FIG. 7, and is propagated further through the fourth polarization plane-maintaining optical fiber 26.

Thus, regardless of the inclusion of the optical phase biasing circuit 40, component S1 and component S2 pass along the respective light paths thereof in polarization states the same as in the first exemplary embodiment, except at a certain location. Therefore, the basic optical modulation operations and the present invention disclosed in the descriptions of the first exemplary embodiment are maintained in the second exemplary embodiment.

However, in the second exemplary embodiment, component S1 and component S2 pass through the birefringent medium 282 provided inside the optical phase biasing circuit 40 in states of linear polarization that are parallel to mutually orthogonal axes (the X axis and the Y axis). Consequently, an optical phase difference based on the birefringence of the birefringent medium 282 arises between the two components.

This optical phase difference may cancel out the phase shift that is caused to component S2 by the cross phase modulation effect with the opposite-running control light, by being set to a value which is a positive-negative reversal of the phase shift that is caused to component S2 by the cross phase modulation effect with the opposite-running control light.

That is, according to the second exemplary embodiment, even if an optical pulse signal with a high duty ratio is used as the control light, there is no deterioration of the extinction ratio or waveform distortion or the like, and generation of an excellent amplitude-modulated optical signal is enabled. What this means is that it is possible to use a non-return-to-zero signal as the control light, in which the light intensity does not change between successive "one" signals. In such a case, when continuous light is used as the signal light instead of an optical pulse train, generation of amplitude-modulated optical signals and phase-modulated optical signals for similar non-return-to-zero systems is enabled.

Third Exemplary Embodiment

Next, a third exemplary embodiment of an optical signal generation apparatus of the present invention will be described with reference to the drawings.

The third exemplary embodiment describes an exemplary embodiment of an optical signal generation apparatus that is to be included with the structure of an all-optical optical modulator described in the first exemplary embodiment or the second exemplary embodiment.

Structure of the Third Exemplary Embodiment

FIG. 8 is a diagram showing a structure of an optical signal generation apparatus 2A of the third exemplary embodiment.

In FIG. 8, the optical signal generation apparatus 2A of the third exemplary embodiment is structured to include at least a second optical coupler 60, a third optical coupler 62, a fourth optical coupler 64, a fifth optical coupler 66, a clock sampling circuit 70, an optical pulse light source 80, an optical pulse light source 82, an optical PLL (phase locked loop) circuit 90, an optical data identification circuit 100, and an all-optical optical modulator 50.

The optical signal generation apparatus 2A is formed to be capable of inputting optical data from outside, of which an encoding format is either of a phase modulation system and an amplitude modulation system, and suitably selecting and generating a modulated optical signal in an encoding format of either of a phase modulation system and an amplitude modulation system.

For the all-optical optical modulator 50, the all-optical optical modulator described for the first exemplary embodiment or the second exemplary embodiment may be employed. The all-optical optical modulator 50 takes in signal light (wavelength $\lambda s$) from the optical pulse light source 82 via the signal light input optical fiber 32-1, takes in control light (wavelength $\lambda p$) from the optical coupler 64 via the control light input/output port 31, and outputs an eventually desired modulated optical signal through the output fiber 29.

The detailed internal structure of the all-optical optical modulator 50 has been described for the first and second exemplary embodiments, so detailed descriptions will not be given here.

The second to fifth optical couplers 60, 62, 64 and 66 are optical couplers having at least three input/output ports for light signals. For the second to fifth optical couplers 60, 62, 64 and 66, couplers may be employed that output an optical signal input through one input port from two output ports with a suitably designed output splitting ratio, and/or couple respective optical signals input through two input ports with a suitably designed output coupling ratio and output the coupled signal from one output port.

The second optical coupler 60 includes a port 60-1, which inputs an optical data signal, a port 60-2, which outputs to a port 62-1 of the third optical coupler 62, and a port 60-3, which outputs to the clock sampling circuit 70.

The third optical coupler 62 includes the port 62-1, which inputs an optical signal output from the port 60-2 of the optical coupler 60, a port 62-2, which outputs to a port 66-1 of the fifth optical coupler 66, and a port 62-3, which outputs to the optical PLL circuit 90.

The fifth optical coupler 66 includes the port 66-1, which inputs an optical signal output from the port 62-2 of the third optical coupler 62, a port 66-2, which outputs to the optical data identification circuit 100, and a port 66-3, which outputs to a port 64-2 of the fourth optical coupler 64.

The fourth optical coupler 64 includes a port 64-2, which inputs an optical signal output from the port 66-2 of the fifth optical coupler 66, a port 64-3, which inputs output from the optical pulse light source 80, and a port 64-1, which outputs control light to the all-optical optical modulator 50.

The clock sampling circuit 70 inputs an optical data signal output from the port 60-3 of the second optical coupler 60 and, on the basis of the input optical data signal, extracts an electronic clock with a frequency corresponding to the bit rate of the optical data signal. Here, the input optical data signal is an amplitude-modulated or phase-modulated optical data signal with wavelength λp.

Herein, the electronic clock signal with a frequency corresponding to the bit rate means an electronic modulated signal with a sinusoidal form or pulse form that has timings synchronized with the optical data signal, and has a continuously recurring waveform of which the frequency is, for example, 10 GHz when the bit rate of the optical data signal input from outside the apparatus is 10 Gbit/s.

The clock sampling circuit 70 outputs the extracted electronic clock signal to the optical pulse light sources 80 and 82.

The optical pulse light source 82 inputs the electronic clock signal output from the clock sampling circuit 70 and, on the basis of the electronic clock signal, generates a continuous optical clock pulse train with wavelength λs, with timings synchronized with the optical data signal. The optical pulse light source 82 then provides the generated optical clock pulse train to the all-optical optical modulator 50 to serve as signal light.

Herein, for example, a previously known mode-synchronized semiconductor laser, mode-synchronized fiber laser or the like may be employed as the optical pulse light source 82. Alternatively, a light source in which a continuous light source with wavelength λs is combined with an optical intensity modulator, such as a $LiNbO_3$ optical modulator, a semiconductor field absorption-type optical modulator or the like, may be employed as the optical pulse light source 82.

The optical PLL circuit 90 inputs the optical data signal output from the port 62-3 of the third optical coupler 62, senses the optical phase of an optical carrier component included in the optical data signal, and consequently provides continuous light with wavelength λp that is phase-synchronized with the optical carrier component of the optical data to the optical pulse light source 80.

As structures and operational principles of the optical PLL circuit 90, technologies such as heterodyne wave detection, which is used at reception terminals of coherent optical communications systems that have been researched and developed heretofore, and the like may be employed.

The optical pulse light source 80 inputs the electronic clock signal from the clock sampling circuit 70 and inputs the continuous light with wavelength λp from the optical PLL circuit 90. The optical pulse light source 80 synchronizes timings with the optical data signal using the electronic clock signal, and generates a continuous optical pulse train with wavelength λp, the optical phase of which is synchronized with the continuous light with wavelength λp. The optical pulse light source 80 also provides the generated optical pulse train with wavelength λp to the port 64-3 of the fourth optical coupler 64.

Herein, a light source that is operated by inputting continuous light from the optical PLL circuit 90 to an optical intensity modulator, such as a $LiNbO_3$ optical modulator, a semiconductor field absorption-type optical modulator or the like, may be employed as the optical pulse light source 80. Alternatively, a mode-synchronized semiconductor laser that is operated by optical injection locking with the continuous light from outside, as described in Reference B, may be employed as the optical pulse light source 80.

Reference B: Shin Arahira, Hiroki Yaegashi, Koji Nakamura, and Yoh Ogawa, "Chirp Control and Broadband wavelength-tuning of 40-GHz Monolithic Actively mode-locked laser diodes module with an external CWlight injection", IEEE J. Selected Topics in Quantum Electron, Vol. 11, No. 5, pp. 1103-1111, 2005.

The optical data identification circuit 100 is an identification circuit that inputs the optical data signal output from the port 66-2 of the fifth optical coupler 66 and identifies whether the input optical data signal is a phase-modulated signal or an amplitude-modulated signal.

The optical data identification circuit 100 then provides a control electronic signal corresponding to the identification result to the all-optical optical modulator 50. Accordingly, the all-optical optical modulator 50 may control a rotation adjustment of the half-wavelength plate 14 described in the first and second exemplary embodiments on the basis of the control electronic signal.

Herein, a method for identification of the optical data signal is described in detail in a section on operations hereafter. A location of arrangement of the optical data identification circuit 100 is not limited to the position shown in FIG. 8, and may be such that the optical data identification circuit 100 is provided on any light path, as long as the optical data identification circuit 100 is at a location at which the input optical data signal can be received.

Operation of the Third Exemplary Embodiment

Next, operation of the third exemplary embodiment will be described while referring to the drawings.

Firstly, the optical data signal is input into the optical signal generation apparatus 2A from outside the apparatus. The optical data signal is input into the port 60-1 of the second optical coupler 60, output from the port 60-3 of the second optical coupler 60, and input into the clock sampling circuit 70.

When the optical data signal is input into the clock sampling circuit 70, the clock sampling circuit 70, on the basis of the optical data signal, extracts an electronic clock signal with a frequency corresponding to the bit rate of the optical data signal.

Then, the electronic clock signal is provided to the optical pulse light sources 80 and 82 and, by driving of the optical pulse light sources 80 and 82 using the electronic clock signal, optical clock pulses synchronized in timing with the optical data signal are continuously output.

The optical clock pulse train with wavelength λs from the optical pulse light source 82 passes through the signal light input optical fiber 32-1 and is input into the all-optical optical modulator 50 to serve as the signal light.

Meanwhile, the optical data signal output from the port 60-2 of the second optical coupler 60 is input into the port 62-1 of the third optical coupler 62. The optical data signal is split in two, from the ports 62-2 and 62-3 of the third optical coupler 62, and is output to the fifth optical coupler 66 and the optical PLL circuit 90.

When the optical data signal is input into the optical PLL circuit 90, optical phase detection of the optical carrier component of the optical data signal is executed in the optical PLL circuit 90. As a result, continuous light with wavelength λp, which is synchronized in optical phase with the optical carrier component of the optical data signal, is provided to the optical pulse light source 80.

When the continuous light with wavelength λp from the optical PLL circuit 90 is input into the optical pulse light source 80, the optical pulse light source 80 operates as an optical pulse light source that generates a continuous optical clock pulse train, with the same wavelength λp as the optical data signal from outside the apparatus, that is synchronized in optical phase with the optical data signal.

At the same time, the optical pulse light source 80 receives the electronic clock signal from the clock sampling circuit 70 and is driven, and thus the generated optical clock pulse train is provided with timing synchronization with the optical data signal input from outside the apparatus.

The optical clock pulse train with wavelength λp from the optical pulse light source 80 is input into the port 64-3 of the fourth optical coupler 64.

The optical clock pulse train from the optical pulse light source 80 that is employed here, for reasons which will be described in detail below, must have the same wavelength as the continuous light from the optical PLL circuit 90, and therefore as the optical data signal input from outside the apparatus, and must be synchronized in optical phase with the same.

Meanwhile, the optical data signal output from the port 62-2 of the third optical coupler 62 passes along a light path of a suitable optical fiber or the like, and is then input into the port 64-2 of the fourth optical coupler 64.

As a result, a combined wave, of the optical clock pulse train with wavelength λp from the optical pulse light source 80 and the optical data signal with wavelength λp input from outside the apparatus, is output from the port 64-1 of the fourth optical coupler 64.

Here, the optical data signal is a signal in which, while in practice the optical data signal input into the apparatus is split in a number of stages by optical couplers and the like, signal quality is the same as the optical data signal initially input into the apparatus, except in intensity. Therefore, results of signal processing thereof can be considered to be the same as results of signal processing applied to the optical data signal initially input into the apparatus.

The combined wave output from the port 64-1 of the fourth optical coupler 64 is an output of interference between the optical clock pulse train with wavelength λp from the optical pulse light source 80 and the optical data signal with wavelength λp input from outside the apparatus.

Polarization planes of these two lights are adjusted so as to be in the same direction. This may be simply realized, for example, by suitably including a polarization plane adjustment portion such as a polarization plane controller or the like on the light paths until these two, lights reach the ports 64-2 and 64-3 of the fourth optical coupler 64. Alternatively, a polarization plane-maintaining portion such as a polarization plane-maintaining fiber or the like may be employed.

A pulse width and pulse intensity of the optical clock pulse train with wavelength λp from the optical pulse light source 80 are set to be the same as a pulse width and pulse intensity of the optical data signal input into the port 64-2 of the fourth optical coupler 64. This may be realized by adjusting driving conditions of the optical pulse light source 80 and/or suitably including an optical amplifier on the light paths until the optical data signal and the optical clock pulse train reach the ports 64-2 and 64-3 of the fourth optical coupler 64.

Next, referring to FIG. 9A to FIG. 9F, the interference output of the optical clock pulse train with wavelength λp from the optical pulse light source 80 and the optical data signal with wavelength λp input from outside the apparatus, which is output from the port 64-1 of the fourth optical coupler 64, will be considered.

Figure 9A:
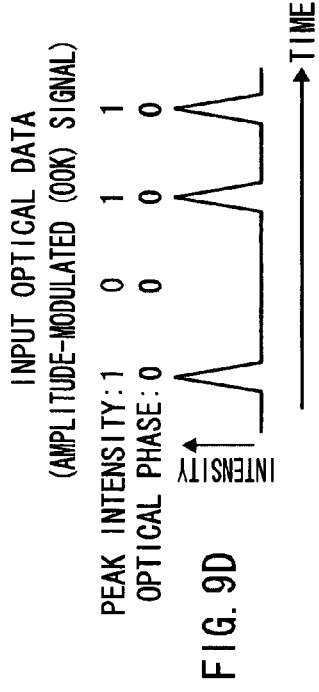
FIG. 9A to FIG. 9F are explanatory diagrams describing generation of control light in the third exemplary embodiment.
Figure 9B:
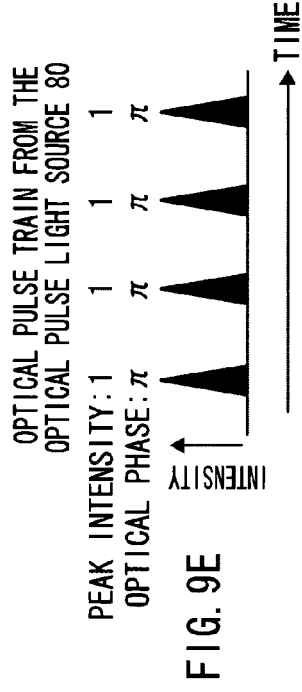
Figure 9C:
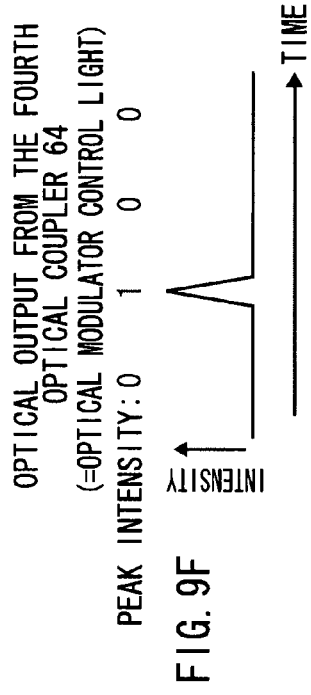

FIG. 9A to FIG. 9C illustrates a case in which the input optical data signal is a phase-modulated signal. In this case, as shown in FIG. 9A, a four-bit phase-modulated signal in which the optical phases of the input optical data signal are $(\pi,0,\pi,\pi)$ is considered. As shown in FIG. 9A, in comparison with the input optical data signal, the optical phases of the optical clock pulse train are relatively set to π.

Because the optical clock pulse train is output with optical phases synchronized with the input optical data signal, the relative optical phase relationship between the input optical data signal and the optical clock pulse train can be stably maintained in the state shown in FIG. 9B.

Here, the interference output, between the optical clock pulse train with wavelength λp from the optical pulse light source 80 and the optical data signal with wavelength λp input from outside the apparatus, that is output from the port 64-1 of the fourth optical coupler 64 is as shown in FIG. 9C.

That is, when the optical phase of the optical data signal is 0, because the optical phase of the optical clock pulse train is π, the result of interference in counter-phase is that the intensity of the combined output (interference output) is 0. When the optical phase of the optical data signal is π, because the optical phase of the optical clock pulse train is π, the combined output adds the two together and exhibits a significant optical intensity.

As a result, the combined output from the fourth optical coupler 64 is an amplitude-modulated signal in which optical peak intensities are modulated to (1,0,1,1). That is, an amplitude-modulated signal is provided from the port 64-1 of the fourth optical coupler 64 with a signal pattern the same as the signal pattern of the input optical data signal, with states of the input optical data signal with optical phases of π replaced with optical peak intensities of 1 and states of the input optical data signal with optical phases of 0 replaced with optical peak intensities of 0.

Figure 9D:
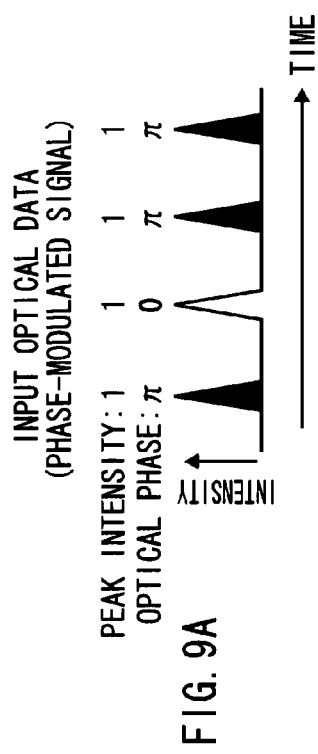
Figure 9E:
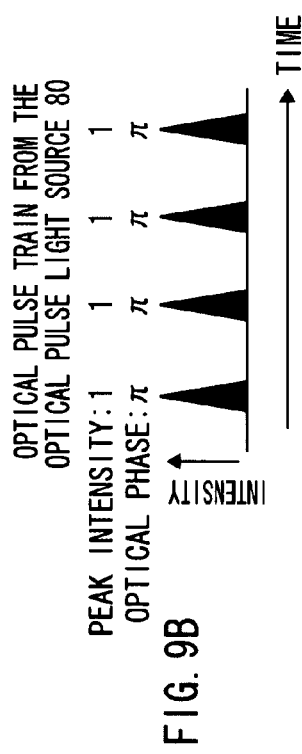
Figure 9F:
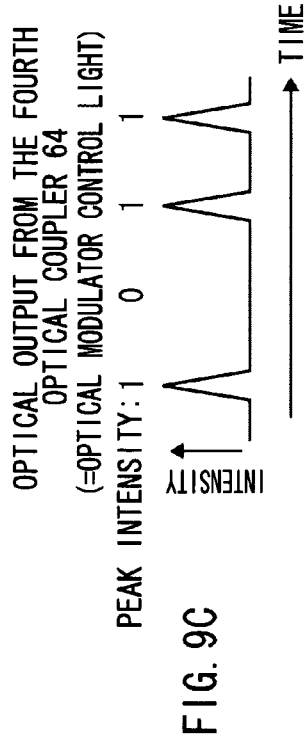

Next, FIG. 9D to FIG. 9F illustrates a case in which the input optical data signal is an amplitude-modulated signal. In this case, as shown in FIG. 9D, a four-bit amplitude-modulated signal in which the optical peak intensities of the input optical data signal are (1,0,1,1) is considered. Because this is an amplitude-modulated signal, optical phases of the signal are all the same, optical phases of the signals here being set to 0.

Then, as shown in FIG. 9E, the optical phases of the optical clock pulse train are relatively set to π compared with the input optical data signal, similarly to the case in FIG. 9A to FIG. 9C.

Similarly to the previous case, the optical clock pulse train and the input optical data signal are output with optical phases synchronized. Therefore, the relative optical phase relationship between the input optical data signal and the optical clock pulse train can be stably maintained in the state shown in FIG. 9E.

Here, the interference output, between the optical clock pulse train with wavelength λp from the optical pulse light source 80 and the optical data signal with wavelength λp input from outside the apparatus, that is output from the port 64-1 of the fourth optical coupler 64 is as shown in FIG. 9F.

That is, when the optical peak intensity of the optical data signal is 1, because the optical phase of the optical clock pulse train is π, the result of interference in counter-phase is that the intensity of the combined output (interference output) is 0. When the optical peak intensity of the optical data signal is 0, because the optical phase of the optical clock pulse train is π, the optical waveform of the optical clock pulse train is output as is and exhibits a significant optical intensity in the combined output.

As a result, the combined output from the fourth optical coupler 64 is an amplitude-modulated signal in which optical peak intensities are modulated to (0,1,0,0). That is, an amplitude-modulated signal is provided from the port 64-1 of the fourth optical coupler 64 with a signal pattern the same as the signal pattern of the input, optical data signal, but with states of the input optical data signal with optical peak intensities of 1 replaced with optical peak intensities of 0 and states of the input optical data signal with optical peak intensities of 0 replaced with optical peak intensities of 1.

From the above discussion, an amplitude-modulated signal with a signal pattern the same as the signal pattern of the input optical data signal is obtained from the port 64-1 of the fourth optical coupler 64 regardless of whether the input optical data signal is a phase-modulated signal or an amplitude-modulated signal. By using this as the control light and inputting the same into the control light input/output port 31 of the all-optical optical modulator 50, eventually, a modulated optical signal with a signal pattern the same as the signal pattern of the input optical data signal can be obtained from the output optical fiber 29 of the all-optical optical modulator 50.

The results considered in FIG. 9A to FIG. 9F arise because the optical clock pulse signal input into the port 64-3 of the fourth optical coupler 64 is synchronized in optical phase and has the same wavelength as the optical data signal input from outside the apparatus, a portion of which is input into the port 64-2 of the fourth optical coupler 64.

If the optical clock pulse train is not synchronized in optical phase with the input optical data signal but had some relative optical phase, the relative optical phase relationship between the input optical data signal and the optical clock pulse train might not maintain a constant relationship as shown in FIG. 9B and FIG. 9E. In such a case, if, for example, the input optical data signal is a phase-modulated signal, then when the optical phase of the optical data signal is 0, the intensity of the combined output (interference output) would not be 0. That is, the signal pattern of the interference output would not match the signal pattern of the initial optical data signal. This would cause encoding errors in the modulated optical signal that is eventually output.

Further, if the wavelength of the optical clock pulse train and the wavelength of the input optical data signal did not match, intensity variations with a period corresponding to the difference in wavelengths would occur in the interference output. In such a case too, the signal pattern of the interference output would not match the signal pattern of the initial optical data signal, and encoding errors would occur in the modulated optical signal that is eventually output.

That is, as shown in FIG. 9A to FIG. 9F, in order to obtain a signal pattern of the interference output that matches the signal pattern of the initial optical data signal, there is a necessity for the optical clock pulse train to be synchronized in optical phase and have the same wavelength as the input optical data signal. This may be realized by utilizing, for the previously described optical pulse light source 80, an optical intensity modulator that is operated by inputting the continuous light from the optical PLL circuit 90 or a mode-synchronized semiconductor layer that is operated by optical injection locking with the continuous light from the optical PLL circuit 90, as disclosed in Reference B.

If the baseband signal sequence pattern of the optical data signal input from outside the apparatus, which is shown in FIG. 9A or FIG. 9D and is phase-modulated or amplitude-modulated, is defined as being (1,0,1,1) and the baseband signal sequence pattern of the eventually output modulated optical signal is considered: In a case in which the intensity pattern of control light shown in FIG. 9C or FIG. 9F is reflected and the optical data signal input from outside the apparatus is a phase-modulated signal, the sequence pattern is the same as the initial optical data signal of (1,0,1,1); whereas in a case in which the initial data signal is an amplitude-modulated signal, the sequence pattern is (0,1,0,0), which is logically inverted from the optical data signal input from outside.

The logical inversion of the control light, when the optical data signal input from outside the apparatus is an amplitude-modulated signal and the eventually desired modulated optical signal is a phase-modulated signal, the phase-modulated signal simply has opposite optical phases of the optical signal, and therefore it is not a problem.

When the eventually desired modulated optical signal is an amplitude-modulated signal, it is sufficient to deal with this by, for example, considering inversions of logical identification at a reception terminal. Thus, this will not be an especially significant problem in practice, and may be avoided.

For example, in the second exemplary embodiment shown in FIG. 6, in addition to the correction to the phase shift in accordance with the cross phase modulation effect from the opposite-running control light, a further phase shift amount of $\pi$ is provided to the optical phase provided at the optical phase biasing circuit.

In such a case, output ports of a positive logic signal and a logically inverted signal of the amplitude-modulated signal are swapped. That is, a logically inverted signal may be output from the output optical fiber 29. Thus, in this case, an amplitude-modulated optical signal with a sequence pattern the same as the input optical data signal, i.e., (1,0,1,1) may be obtained.

The switching of the modulation format of the modulated optical signal output by the output optical fiber 29 (i.e., the switching from phase modulation to amplitude modulation or vice versa) is implemented by implementing a rotation of the optical axis of the half-wavelength plate 14 in accordance with a control signal that is generated from a base station, such as an optical relay at which the present apparatus is disposed or the like.

Alternatively, for an application that does not depend on a conversion of modulation format between the optical data signal input from outside the apparatus and the eventually desired modulated optical signal, usage as follows is possible. Here, not depending on a conversion of modulation format means that only an amplitude-modulated signal is output when the input optical data signal is an amplitude-modulated signal and only a phase-modulated signal is output when the input optical data signal is a phase-modulated signal.

That is, the fifth optical coupler 66 is included in a light path along which the optical data signal is propagated to couple the port 62-2 of the third optical coupler 62 with the port 64-2 of the fourth optical coupler 64, and a split output of the optical data signal is obtained and input into the optical data identification circuit 100. In the optical data identification circuit 100, identification is performed as to whether the modulation format of the input optical data signal is a phase-modulated signal or an amplitude-modulated signal. In accordance with a result of the identification, a control electronic signal is generated, and an optical axis rotation of the half-wavelength plate 14 is implemented in accordance with this electronic signal.

As a result, identification of the modulation format of the optical data signal input from outside the apparatus is performed automatically, and an autonomous apparatus structure is possible.

Regardless of the structural example in FIG. 8, this optical data identification circuit 100 may be included on any light path through which the optical data signal input into the apparatus passes.

FIG. 10A and FIG. 10B are schematic explanatory diagrams describing an optical data signal identification method according to the optical data identification circuit 100. A circuit that identifies an optical data signal by the method illustrated in FIG. 10A and FIG. 10B may be employed for the optical data identification circuit 100.

In FIG. 10A, in cases in which the optical pulses constituting optical data signals have the same pulse waveforms and average intensities of the optical data signals are the same, the modulation formats of the optical data signals have a difference in peak intensities of the optical pulses constituting the optical data signals.

Specifically, the optical data identification circuit 100 may employ a method of identifying optical data signals by sensing the peak intensities of an optical data signal. Specifically, in a case in which the optical data signal is a phase-modulated signal, the peak intensities of the optical pulses are the same for one signals and zero signals. The peak intensity here is referred to as Ip. In contrast, in a case in which the optical data signal is an amplitude-modulated signal, the peak intensities of one signals and zero signals differ. Now, if the optical signal is an on-off keying signal and the mark rate thereof is M, then the peak intensity of a one signal is Ip/M, being strengthened by a factor of 1/M relative to the peak intensity in the case in which the optical data signal is a phase-modulated signal. Therefore, it is possible to identify whether an optical data signal is an amplitude-modulated signal or a phase-modulated signal by sensing peak intensities.

As a further example, the optical data identification circuit 100 may sample peak intensities of individual optical signals in the optical data signal that is input into the apparatus, examine a distribution thereof, and judge that a signal for which this distribution is very wide is an amplitude-modulated signal or judge that a signal for which this distribution is narrow is a phase-modulated signal.

Further, as illustrated in FIG. 10B, the optical data identification circuit 100 may perform identification on the basis of differences between the optical spectra of phase-modulated signals and amplitude-modulated signals.

As a specific example, as shown in FIG. 10B, an amplitude-modulated signal has discrete spectral components at optical carrier wave components. In contrast, a phase-modulated signal does not have discrete spectral components at an optical carrier wavelength but the optical spectrum is broadly spread in the vicinity of the optical carrier wavelength.

The optical data signal is passed through an optical band-pass filter that has a peak transmissivity at a wavelength slightly separated from the optical carrier wavelength and has quite a narrow band. Accordingly, if the optical data signal is an amplitude-modulated signal, the intensity of the optical data signal passing through the optical band-pass filter is low. In contrast, if the optical data signal is a phase-modulated signal, the intensity of the optical data signal passing through the optical band-pass filter is high, reflecting the broadness of the optical spectrum. Therefore, the optical data identification circuit 100 may identify whether an optical data signal is an amplitude-modulated signal or a phase-modulated signal by sensing the intensity of an optical data signal that passes through such an optical band-pass filter.

As described above, according to the third exemplary embodiment, by realizing an optical signal generation apparatus provided with the all-optical optical modulator described in the first and second exemplary embodiments, an optical signal generation apparatus may be provided that is capable of suitably selecting and generating a modulated optical signal in an encoding format of either of a phase modulation system and an amplitude modulation system, regardless of which of the phase modulation system and the amplitude modulation system the encoding format of an optical data signal that is input from outside is in.

Fourth Exemplary Embodiment

Next, a fourth exemplary embodiment of the optical signal generation apparatus of the present invention will be described with reference to the drawings.

Figure 11:
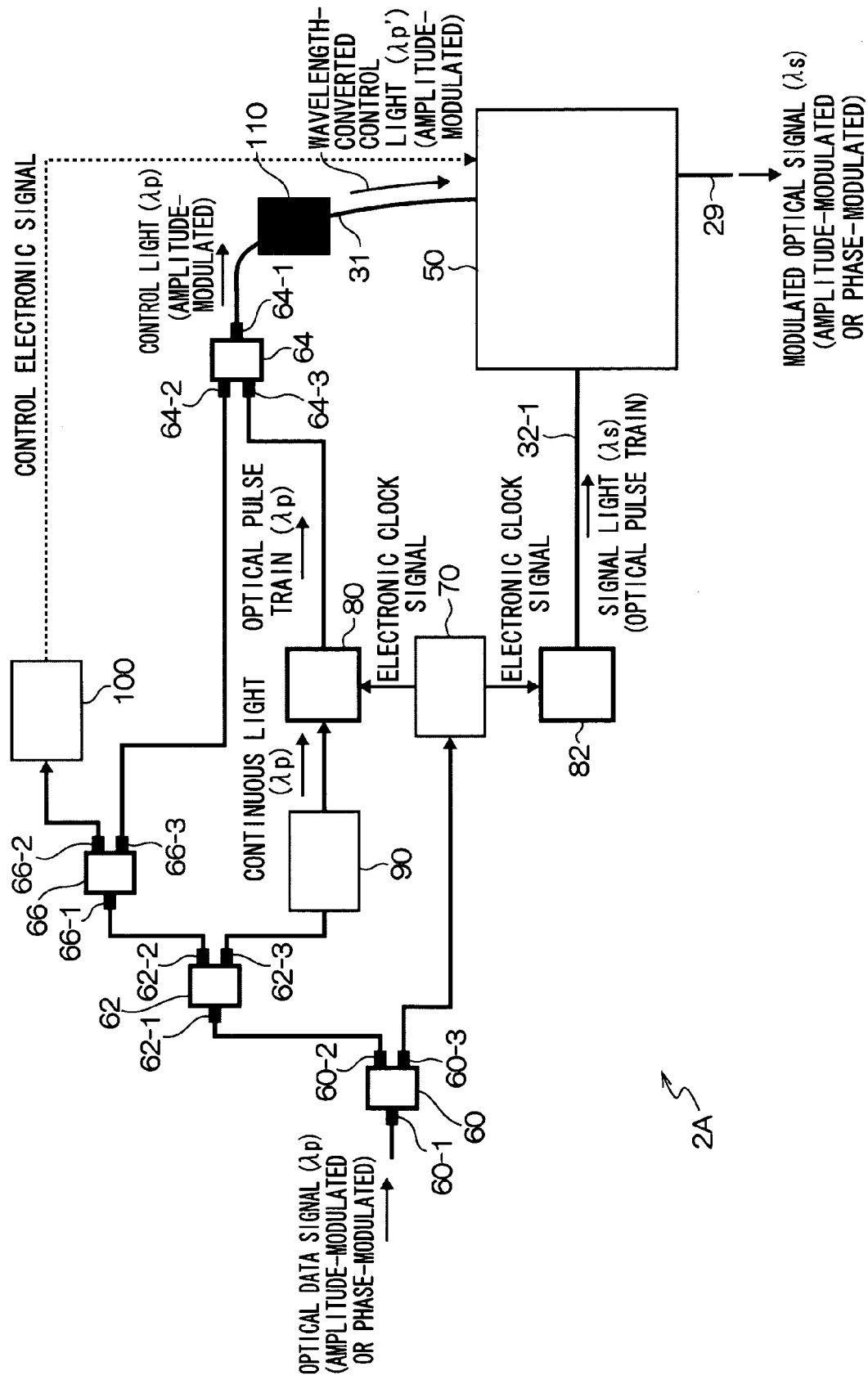
FIG. 11 is a diagram showing a structure of an optical signal generation apparatus of a fourth exemplary embodiment.

FIG. 11 is a diagram showing a structure of an optical signal generation apparatus 2B of the fourth exemplary embodiment.

In FIG. 11, the optical signal generation apparatus 2B of the fourth exemplary embodiment is structured to include at least the second optical coupler 60, the third optical coupler 62, the fourth optical coupler 64, the fifth optical coupler 66, the clock sampling circuit 70, the optical pulse light source 80, the optical pulse light source 82, the optical PLL (phase locked loop) circuit 90, the optical data identification circuit 100, the all-optical optical modulator 50, and a wavelength converter 110.

The optical signal generation apparatus 2B of the fourth exemplary embodiment illustrated in FIG. 11 differs from the optical signal generation apparatus 2A of FIG. 8 in that the wavelength converter 110 is newly added and in functioning of the optical pulse light source 82. Other structures are the same as in the structure of the optical signal generation apparatus 2A of FIG. 8, so the fourth exemplary embodiment will be described focusing on the constitution of the wavelength converter 110 and the optical pulse light source 82.

In the all-optical optical modulator 50 of the third exemplary embodiment, in order to separate the signal light from the control light, it is necessary for wavelengths thereof to be made different to an extent such that signal light wavelength components alone can be selectively transmitted through the optical band-pass filters 28 and 38. Therefore, the third exemplary embodiment fundamentally depends on a wavelength conversion operation, with the wavelength of the optical data signal input from outside ($\lambda$p) and the wavelength of the modulated optical signal that is eventually generated ($\lambda$s) being different.

However, there are many applications that require operations with the wavelengths matching. For example, this applies if the optical signal generator of the third exemplary embodiment is to be used as a relay for long-distance transmissions. In the fourth exemplary embodiment, using the wavelength converter 110, the wavelength of the control light to be input into the all-optical optical modulator 50 is converted to a wavelength ($\lambda$p') that is different from the wavelength of the optical data signal input from outside ($\lambda$p). Hence, even if the wavelength of the signal input into the all-optical optical modulator 50 ($\lambda$s) and the wavelength of the optical data signal input from outside ($\lambda$p) match, because the signal light wavelength component alone can be selectively passed through the optical band-pass filters 28 and 38 with the control light wavelength component being blocked, optical modulation operations in the all-optical optical modulator 50 will not be hindered.

The wavelength converter 110 is disposed on a light path optically communicating with the port 64-1 of the fourth optical coupler 64 with the control light input/output port 31 of the all-optical optical modulator 50. The wavelength converter 110 converts the wavelength of output light from the port 64-1 of the fourth optical coupler 64, and provides the light with the converted wavelength to the all-optical optical modulator 50.

Various types of converter may be used as the wavelength converter 110. For example, the following may be used: a semiconductor amplifier; a non-linear optical crystal such as LiNbO$_3$ or the like; a device that incorporates an optical waveguide to a non-linear optical crystal with a pseudo-phase-matching structure based on polar inversion; and a converter that employs a 3-wave mixing effect or 4-wave mixing effect in an optical fiber or the like.

If the wavelength converter 110 can employ a wavelength converter in accordance with an optical signal regeneration effect based on the optical Kerr effect in an optical fiber or the like as disclosed in Reference C or the like, an optical signal generation apparatus based on the optical signal regeneration effect can be provided.

Reference C: P. V. Mamyshev, "All-Optical data Regeneration based on self-phase modulation effect", Technical digest of European Conference on Optical Communication 98 (ECOC 98), vol. 1, pp. 475-476, Madrid, Spain, 1998.

The optical pulse light source 82 uses the electronic clock signal from the 78 and generates an optical pulse train with wavelength λp that is synchronized in timing with the optical data signal input from outside the apparatus. Therefore, an optical pulse train that is matched with the wavelength λp of the optical data signal input from outside can be provided to the all-optical optical modulator 50.

The structure of the optical signal generation apparatus 2B is not limited to the structure shown in FIG. 11. For example, rather than using the optical pulse light source 82, the optical pulse light source 80 alone may be prepared and an optical clock output therefrom split in two by an optical coupler or the like, with one output which is optically communicates to the signal light input optical fiber 32-1 of the all-optical optical modulator 50 and provided as signal light and the other output which is optically communicates to the port 64-3 of the fourth optical coupler 64 in order to interfere with the optical data signal input from outside.

In such a case, the structure does not require the optical pulse light source 82. Other structures are the same as in the third exemplary embodiment, so descriptions thereof will be foregone here.

Specifically, according to the fourth exemplary embodiment, an optical signal generation apparatus may be provided that generates a phase-modulated or amplitude-modulated modulated optical signal with the same wavelength as an optical data signal input from outside.

Other Exemplary Embodiments

In the first to fourth exemplary embodiments, optical fibers have been considered as mediums that produce the cross phase modulation effect based on the optical Kerr effect. However, the present invention is not limited to such use of optical fibers. As long as an optical device features that altering an optical phase of controlled light in accordance with control light, many different kinds of device may be used in accordance with application modes thereof, and the effects of the present invention produced. For example, if a bit rate of operations is a comparatively low bit rate such as 1 Gb/s or the like, a semiconductor optical amplifier, electro-absorptive optical modulator or the like may be utilized. Furthermore, silicon filament waveguides, which are formed with Si as a core and SiO$_2$ as cladding, may be employed.

What is claimed is:

1. An optical modulator comprising:
a first polarization separation and combination portion that comprises a first input and output terminal, at which signal light that is linearly polarized light is input, a second input and output terminal, which is provided at a side opposite from the first input and output terminal, and a third input and output terminal, which outputs modulated signal light;
a second polarization separation and combination portion that comprises a first input and output terminal, a second input and output terminal, which is provided at a side opposite from the first input and output terminal, a third input and output terminal, and a fourth input and output terminal, which is provided at a side opposite from the third input and output terminal and outputs a polarization cross-talk component of the signal light;
a first polarization plane-maintaining optical fiber of which a first end is coupled with the second input and output terminal of the first polarization separation and combination portion;
a second polarization plane-maintaining optical fiber of which a first end is coupled with the first input and output terminal of the second polarization separation and combination portion;
a polarization plane rotation adjustment portion that comprises a half-wavelength plate which optically communicates with a second end of the first polarization plane-maintaining optical fiber and a second end of the second polarization plane-maintaining optical fiber, an optical axis direction of the half-wavelength plate being rotatable;
a third polarization plane-maintaining optical fiber of which a first end is coupled with the second input and output terminal of the second polarization separation and combination portion, the third polarization plane-maintaining optical fiber including a first optical coupler, to which control light that is linearly polarized light is input;
a fourth polarization plane-maintaining optical fiber of which a first end is coupled with the third input and output terminal of the second polarization separation and combination portion; and
a first polarization plane conversion portion that optically communicates with a second end of the third polarization plane-maintaining optical fiber and a second end of the fourth polarization plane-maintaining optical fiber, the first polarization plane conversion portion converting a polarization plane of input signal light.

2. The optical modulator according to claim 1, wherein the first polarization plane conversion portion is formed by fusing the third polarization plane-maintaining optical fiber and the fourth polarization plane-maintaining optical fiber together, with an optical axis of the third polarization plane-maintaining optical fiber and an optical axis of the fourth polarization plane-maintaining optical fiber being oriented at 90° to one another.

3. The optical modulator according to claim 1, wherein the third input and output terminal of the first polarization separation and combination portion optically communicates with a signal light output portion that outputs signal light.

4. The optical modulator according to claim 2, wherein the third input and output terminal of the-first polarization separation and combination portion optically communicates with a signal light output portion that outputs signal light.

5. The optical modulator according to claim 1, wherein the first input and output terminal of the first polarization separation and combination portion optically communicates with a signal light input portion that inputs signal light.

6. The optical modulator according to claim 2, wherein the first input and output terminal of the first polarization separation and combination portion optically communicates with a signal light input portion that inputs signal light.

7. The optical modulator according to claim 1, further comprising a phase shift elimination portion, which eliminates a phase shift caused by cross phase modulation with counter-propagating control light, and is provided on a light path optically communicating the second input and output terminal of the second polarization separation and combination portion, the third polarization plane-maintaining optical fiber, the first polarization plane conversion portion, the fourth polarization plane-maintaining optical fiber and the third input and output terminal of the second polarization separation and combination portion.

8. The optical modulator according to claim 2, further comprising a phase shift elimination portion, which eliminates a phase shift caused by cross phase modulation with counter-propagating control light, and is provided on a light path optically communicating the second input and output terminal of the second polarization separation and combination portion, the third polarization plane-maintaining optical fiber, the first polarization plane conversion portion, the fourth polarization plane-maintaining optical fiber and the third input and output terminal of the second polarization separation and combination portion.

9. The optical modulator according to claim 7, wherein the phase shift elimination portion comprises:
   a first Faraday rotator that rotates a polarization direction of linearly polarized light input through one input and output terminal by +45°;
   a second Faraday rotator that rotates a polarization direction of linearly polarized light input through another input and output terminal by −45°; and
   a birefringent medium between the first Faraday rotator and the second Faraday rotator, one optical axis of the birefringent medium being set in a direction parallel to linearly polarized light that passes through the first Faraday rotator and another optical axis being set in a direction parallel to linearly polarized light that passes through the second Faraday rotator.

10. The optical modulator according to claim 8, wherein the phase shift elimination portion comprises:
    a first Faraday rotator that rotates a polarization direction of linearly polarized light input through one input and output terminal by +45°;
    a second Faraday rotator that rotates a polarization direction of linearly polarized light input through another input and output terminal by −45°; and
    a birefringent medium between the first Faraday rotator and the second Faraday rotator, one optical axis of the birefringent medium being set in a direction parallel to linearly polarized light that passes through the first Faraday rotator and another optical axis being set in a direction parallel to linearly polarized light that passes through the second Faraday rotator.

11. An optical signal generation apparatus comprising:
    a clock signal generation portion that, on the basis of an input optical signal from outside, generates an electronic clock signal with a frequency corresponding to a bit rate of the input optical signal;
    a first optical pulse train generation portion that, on the basis of the electronic clock signal from the clock signal generation portion, generates an optical pulse train that is synchronized with the input optical signal from outside;
    an optical phase synchronization portion that, on the basis of the input optical signal from outside, outputs continuous light with the same wavelength and the same phase as the input optical signal;
    a second optical pulse train generation portion that, on the basis of the electronic clock signal from the clock signal generation portion, receives the continuous light from the optical phase synchronization portion, and generates an optical pulse train with the same wavelength and the same phase as the input optical signal from outside in accordance with an optical injection locking phenomenon;
    an optical coupler that outputs interference light generated between the optical clock pulse train from the second optical pulse train generation portion and the input optical signal from outside; and
    the optical modulator according to claim 1, to which the output light from the optical coupler is input to serve as the control light and the optical pulse train from the first optical pulse train generation portion is input to serve as the signal light.

12. The optical signal generation apparatus according to claim 11, further comprising an optical signal identification portion that, on the basis of the input optical signal from outside, identifies an encoding format of the input optical signal, and provides a result of the identification to the polarization plane rotation adjustment portion of the optical modulator.

13. The optical signal generation apparatus according to claim 11, further comprising a wavelength conversion portion provided on a light path from the optical coupler to the optical modulator,
    wherein the first optical pulse generation portion generates the optical pulse train with a wavelength the same as the wavelength of the input optical signal from outside, and the wavelength conversion portion converts the wavelength of the interference light output from the optical coupler.

14. The optical signal generation apparatus according to claim 12, further comprising a wavelength conversion portion provided on a light path from the optical coupler to the optical modulator,
    wherein the first optical pulse generation portion generates the optical pulse train with a wavelength the same as the wavelength of the input optical signal from outside, and the wavelength conversion portion converts the wavelength of the interference light output from the optical coupler.

* * * * *